INVENTOR
REX RICE

BY Elmer Galbiati
AGENT

Dec. 7, 1965 R. RICE 3,222,653

MEMORY SYSTEM FOR USING A MEMORY DESPITE THE PRESENCE OF DEFECTIVE BITS THEREIN

Filed Sept. 18, 1961 9 Sheets-Sheet 2

FIG. 1c

| TO TERMINAL | | FROM TERMINALS |
|---|---|---|
| 24A | ← | 28C, 402A, 404A, 407A, 411A |
| 24B | ← | 28B, 405A, 409A, 413A, 502A, 504A, 508A, 640A |
| 28A | ← | 203C, 235C |
| 29B | ← | 414A, 415A |
| 30A | ← | 414A, 415A |
| 32B | ← | 28C, 401A, 410A |
| 33B | ← | 28C, 401A, 410A |
| 61A | ← | 401A |
| 62A | ← | 403A, 410A |
| 64A | ← | 401A, 408A, 412A, 501A, 503A, 507A |
| 66A | ← | 403A |
| 67A | ← | 28B, 28C, 403A |
| 68A | ← | 410A, 650C |
| 69A | ← | 235C, 406A |
| 70A | ← | 235C, 406A |
| 71A | ← | 410A |
| 81A | ← | 503A |
| 82A | ← | 501A, 507A |
| 83A | ← | 505A |
| 87A | ← | 640A |
| 90A | ← | 28B, 409A, 413A, 502A, 504A, 508A |
| 91A | ← | 28C, 29A |

| FROM TERMINAL | | TO TERMINAL OR LINE |
|---|---|---|
| 28B | → | 24B, 67A, 90A, 263A |
| 28C | → | 24A, 32B, 33B, 67A, 91A |
| 29A | → | 91A, 202A |
| 32A | → | 201A, 261A |
| 33A | → | 201B, 262A |
| 41B | → | 211A, 233B, 503B, 504B |
| 42B | → | 211B, 233A, 501B, 502B |
| 50A | → | 317B, 650B |
| 50B | → | 617B |

Dec. 7, 1965 R. RICE 3,222,653

MEMORY SYSTEM FOR USING A MEMORY DESPITE THE PRESENCE OF DEFECTIVE BITS THEREIN

Filed Sept. 18, 1961 9 Sheets-Sheet 6

ERROR SEQUENCE #2a(RIGHT)

ERROR SEQUENCE #2a(LEFT)

ERROR SEQUENCE #2b 3,222,653

MEMORY SYSTEM FOR USING A MEMORY DESPITE THE PRESENCE OF DEFECTIVE BITS THEREIN

Rex Rice, Poughkeepsie, N.Y., assignor to International Business Machines Corporation, New York, N.Y., a corporation of New York Filed Sept. 18, 1961, Ser. No. 138,644
16 Claims. (Cl. 340—172.5)

This invention relates to data memories and more particularly to a data memory system designed to reliably operate even though certain of the memory system's storage devices are defective.

One of the most difficult problems encountered in the use of modern mass production techniques is that of achieving uniformity. In many instances the techniques for building devices which operate reliably are well known; however, when these same devices are produced in large quantities by mass production techniques a certain percentage of them is found to be defective. Where the final assembly consists of a large number of components (such as a data memory system which has a large number of individual storage devices), if there is even a small probability that each of the individual components is defective, the probability that the final assembly contains some defective components is very large.

Memory systems usually require that each of the individual storage devices in the memory system meet certain standards. If even a small percentage of the devices from which such memory systems are fabricated do not meet the required standards, there is a high probability that each of the complete systems will include one or more defective storage devices. In order to insure that the assembled systems will include no defective devices, the individual devices are subjected to rigorous tests before assembly; however, such tests sometimes fail to eliminate all the defective components. The problem is compounded when the memory array is manufactured by a batch or bulk technique such as by printed circuit techniques, by thin film vaporation techniques, etc., since when the memory array is manufactured by such batch techniques each individual device in the memory cannot be tested before it becomes a part of the array and hence, the defective devices cannot be eliminated before they become a part of a much larger array of devices. If the memory system requires that each of the individual storage devices meet the required standards, entire arrays of devices must be discarded merely because one or more devices in the array does not meet the required standard.

The present invention provides a control system for a memory which allows a memory which contains defective components to operate reliably. That is, the present invention provides means whereby reliable data storage can be obtained even though the memory system includes defective memory devices. The invention herein disclosed provides means to automatically accommodate for faulty or defective memory devices without any control by, or change in, the machine's program and without any intervention by the machine operator (except where operator intervention is needed to replace information which is lost).

According to one feature of the present invention, information is initially stored in the memory in the usual fashion, and thereafter when any word is read from the memory it goes through a parity checking device to determine if any of the information content of the word has been lost in the storage process. If the parity check indicates that the word does not contain the proper number of "ones" and "zeros" it is assumed that the location in the memory from which the word was obtained is faulty. Once an error is detected, the first step is to correct the defective information word. This is done by an error correcting routine or an error correcting device and in those instances where the error correcting routine or the error correcting device cannot correct the error, operator intervention is used to replace the lost information. Once the information has been corrected it is stored in an auxiliary section of the memory and the defective memory location is tagged. The address of the auxiliary memory location wherein the corrected information is stored is referenced with the address of the defective memory location by (a) storing the address of the auxiliary memory location in the defective memory location if the defective location has sufficient operable bit positions to store the address or (b) by storing both the address of the defective memory location and the address of the auxiliary memory register in the same register in a special section of the memory.

According to another feature of the present invention if the computer references a defective memory location which has been previously tagged as defective the system notes the tag at the defective location and it automatically goes to the auxiliary memory location without the aid of the computer's program or the aid of the machine operator.

It is an object of the present invention to provide a memory system which is capable of reliable operation even though it contains defective components.

It is a further object of this invention to provide a memory system capable of automatically accommodating for defective memory locations.

It is a further object of this invention to provide a memory system in which defective memory locations may be accommodated without program control.

Still another object of the present invention is to provide a memory system adapted to use memory components fabricated by modern batch techniques.

Still another object of the present invention is to provide a highly reliable memory system.

Yet another object of the present invention is to provide a system consistent with the above objects which requires a minimum amount of time for operation.

Still another object of the present invention is to provide a simple, reliable and inexpensive system of compensating for defective memory components.

The foregoing and other objects, features and advantages of the invention will be apparent from the following more particular description of the preferred embodiment of the invention, as illustrated in the accompanying drawings.

In the drawings:

FIGURE 1 is a composite view showing the relationships of FIGURES 1*a* and 1*b* which are an overall information flow diagram of the system.

FIGURE 1*c* is a table tabulating the connections between the terminals shown in FIGURES 1*a* and 1*b*.

FIGURES 2*a* and 2*b* are detailed circuit diagrams showing the sequence initiating circuitry for the system.

FIGURE 3*a* is a detailed circuit diagram of the circuitry which generates the timing pulses which control the sequencing circuitry.

FIGURE 3*b* is a timing diagram showing the output of the timer driver shown in FIGURE 3*a*.

FIGURE 4 is a detailed circuit diagram of the control circuitry which controls the system during the first major control sequence.

FIGURES 5*a*, 5*b* and 5*c* are detailed circuit diagrams of the control circuitry which controls the system during the second major control sequence.

FIGURE 6*a* is a detailed circuit diagram of the matching register access control circuitry.

FIGURE 6*b* is a timing diagram for the timer shown in FIGURE 6*a*.

FIGURES 7*a* and 7*b* are detailed circuit diagrams of the storage register.

To facilitate easy reference between the specification and the drawings, the following uniform numbering scheme is generally used throughout the following description. Numbers which do not have a hundreds digit refer to parts which are shown in FIGURES 1*a* and 1*b*. Any numeral which does have a hundreds digit designates a part which is shown in the figure whose designation is the same as the hundreds digit of the numeral designating the particular part. For example, part 319 is shown in FIGURE 3. In general the various lines and terminals which are connected to circuit elements are designated by the same numeral that designates the circuit elements; however, the numeral is followed by a capital letter. For example, lines 315A, 315B and 315C, are respectively the inputs and the outputs of AND circuit 315.

FIGURES 1*a* and 1*b* are, essentially, information flow diagrams and they are not intended to show the various details of the circuitry. Two types of lines are shown in FIGURES 1*a* and 1*b*: (1) cables which transfer a plurality of bits of information, for example, cable 31D (FIGURE 1*b*) transfers information from circuit 31 to gate 64, and (2) individual control lines, for example control line 71A (FIGURE 1*b*). The control lines shown in FIGURES 1*a* and 1*b* are referred to by the numeral designating the terminal to which they are shown connected in FIGURES 1*a* and 1*b*. The number of bits of information which are transferred over each cable is designated by the numeral contained in the expanded part of the respective cable. For example, cable 23A (FIGURE 1*b*) which connects memory address register 23 to the gate 67 is capable of transmitting nine bits of information.

The interconnections of circuits which are located on different figures is generally shown by means of terminal markings. For example, in FIGURE 1*a* one of the outputs of circuit 41 is terminal 41B. Terminal 41B is connected to lines 211A and 233B (FIGURE 2*b*) hence, each of the lines 211B and 233B are shown in FIGURE 2*b* connected to a terminal marked 41B. In FIGURES 1*a* and 1*b* for clarity of illustration, terminal interconnections are not shown since they are not needed for the initial general description of the invention which is given with references to FIGURES 1*a* and 1*b* and since they would tend to make the drawing confusing. All of the connections to the terminals shown in FIGURES 1*a* and 1*b* are, however, tabulated in FIGURE 1*c*.

FIGURE 1*c* has four columns. The first column lists all of the input terminals shown in FIGURES 1*a* and 1*b* (i.e., those terminals which are adapted to receive signals). The second column lists each of the terminals which activate the terminal listed on the same line in the first column. The third column in FIGURE 1*c* lists each of the output terminals shown in FIGURES 1*a* and 1*b* (i.e. those terminals which supply signals to other terminals). The fourth column lists on each line those terminals which are activated by the output terminal listed on the same line in the third column.

The relationship between FIGURES 1*a* and 1*b* and FIGURE 1*c* can be seen by examining terminal 82A (FIGURE 1*b*) which is activated by signals from either terminals 501A or terminal 507A. Terminals 501A and 507A are shown connected to terminal 82A in FIGURE 1*b*. These same connections are tabulated in the second column of FIGURE 1*c* on the line identified by the number 82A in the first column. The connections to the other terminals are not shown on FIGURES 1*a* and 1*b*; however, the connections to each of the treminals can be identified by examining FIGURE 1*c*.

In general the remaining portion of the specification is arranged as follows: first, the major components of the system are described in a general way mostly with reference to FIGURES 1*a* and 1*b*; second, the operation of the system is described in a general way mostly with reference to FIGURES 1*a* and 1*b*; and third, a more detailed description of the circuit and operation of the system is given.

GENERAL DESCRIPTION OF THE COMPONENTS

*Gate circuits.*—The circuits in FIGURES 1*a* and 1*b* which are designated by a letter G are multiposition gates or more precisely they represent a circuit which has a gate in each bit position of the cables between which the circuit is connected. The flow of information between the cable entering the gate circuit and the cable leaving the gate circuit is regulated by the control line which is also connected to the gate. For example, gate 87 (FIGURE 1*b*) controls the flow of information from cable 87B to cable 87C. Information only flows from cable 87B to 87C when a signal is present on control line 87A. Such circuitry is well known in the art and no further explanation will be given.

*OR circuits 88 and 89.*—Circuits 88 and 89 are multiposition OR circuits. Information on the various lines of either of the cables entering the respective circuits is transferred to the appropriate lines of the cable leaving the particular circuit. OR circuit 88 (FIGURE 1*a*) is connected between cables 88A and 88B and cable 88C, whereby information appearing on cable 88A or 88B is transferred to cable 88C. OR circuit 89 is connected between cables 89A, 89B and 89C and cable 89D whereby information appearing on either cables 89A, 89B or 89C is transferred to cable 89D. Such gating circuitry is well known in the art and no further explanation thereof will be given.

*Memory 20, memory addressing circuit 21, memory control circuit 24 and utilization device 28.*—The specific embodiment of the invention shown herein includes a conventional memory 20 which has a plurality of multibit storage registers, a conventional memory addressing circuit 21 which is capable of addressing any register in memory 20, a conventional type of memory control circuit 24 which controls the memory 20 and the memory addressing circuitry 21 in the normal fashion, and a utilization device 28 which makes use of the information in the memory 20. The memory 20 is used to store the program words and data words for the utilization device 28 as is done in conventional computer technology. In the specific embodiment shown herein each memory register in memory 20 has twenty bit positions and the addresses of the various registers in memory 20 each have eight bit positions plus a parity bit, or a total of nine bits.

The various registers in memory 20 are functionally divided into three sections. The first section which includes most of the registers in the memory is the section wherein the utilization device 28 through memory addressing circuit 21 and memory control circuit 24 normally stores program information and data words. The second section of the memory 20 contains what will be referred to as the auxiliary memory registers and this is the section of the memory wherein a data word is stored when it is found that one of the registers in the first section of the memory is defective. The third section of the memory contains those registers which are referred to as matching registers. Under certain conditions which will be explained in detail later the (1) address of a defective memory location and (2) the address of the auxiliary memory location wherein the corrected data word is stored, are both stored in a register called a matching register. Actually all of the registers in memory 20 are identical and it is merely the use of the registers which divides them into three categories. As will be seen later any register in memory 20 may be assigned to perform any of the described functions.

The utilization device 28 is adapted to operate upon data words which have eighteen bit positions. The eighteen right hand bit positions in each register in memory 20 are used to store the eighteen bits of a data word. The left most two bit positions in each register in memory 20 are called error bit positions and they are used to indicate whether the particular memory register contains valid information (each register in memory 20 has twenty bit positions). If the two error bit positions in any register are set to the "one" condition or if one of the bit positions is set to the "one" condition and the other bit position is set to the "zero" condition it is taken as an indication that the particular register contains valid information. If both of the error bit positions are set to the "zero" condition the system interprets the information in the register as something other than data (to be explained in detail later). The number of bit positions in each register and the number of bit positions in the address of registers is irrelevant to the present invention; however, twenty bit registers and nine bit addresses have been chosen for the purpose of illustration.

During the normal operation of the system each time utilization device 28 desires to read a word from the memory 20 it activates line 28B which is connected to line 24B. Activation of line 24B causes the memory control 24 to read out the desired word and in due course (to be explained in detail later) the word arrives at utilization device 28 via cable 28D. Each time the utilization device 28 desires to store a word in the memory it supplies the word on cable 88B and it activates line 28C which is connected to line 24A. Activation of line 24A causes the memory control 24 to store the word in memory 20. Memory 20, memory addressing circuit 21, memory control circuitry 24 and utilization device 28 are conventional in design and since such circuitry is well known in the art no further explanation of the structure thereof will be given.

*Storage register 22.*—The storage register 22 receives the information which is read out of memory 20 and information which is to be read into memory 20 is first placed in storage register 22. The connections between the storage register 22, the memory 20 and on the memory control circuit 24 are conventional in design and no further explanation thereof will be given. The detailed structure of the storage register 22 per se, is shown in FIGURES 7*a* and 7*b*. Storage register 22 has twenty bit positions. These bit positions are divided into a number of different groupings. Counting from the right hand side of the register the first nine bit positions of the register are designated as the right half of the register. The next nine bit positions are designated as the left half of the register. The last two bit positions of the register, designated 32 and 33 are called error bit positions. Error bit positions 32 and 33 have individual inputs and outputs respectively designated as 32A, 32B, 33A and 33B. The right and the left half of storage register 22 respectively have parity bit positions 34 and 35 associated therewith. The positions 34 and 35 are only used to store parity information for their respective halves of the register when each half of the register is used to store the address of any auxiliary memory location Since the error bits and parity bits of any register in memory 20 only can be interpreted by the memory system when the particular register is read into storage register 22, the error bits and parity bits of any register in memory 20 will be hereinafter referred to by the numerals 32, 33, 34 and 35, it being understood that the system will interpret the parity bits and error bits when the particular register is read through storage register 22.

When the entire eighteen bits of the register are used for a data word or for an instruction word, certain bits (not here specified) are used to store parity information in the normal conventional manner. Information can be placed in storage register 22 by cables 22A, 22B, 22D and 22G, and information can be taken from storage register 22 by cables 22C, 22E and 22F. (Naturally information can also be taken from and placed in register 22 from memory 20.) The specific bit positions in storage register 22 to which the various cables 22A to 22G are connected is shown in FIGURE 7*b*. It should be noted that none of the cables 22A to 22G are connected to the last two bits positions 32 and 33 of storage register 22. The storage register 22 is reset after each read or write operation in a conventional manner. Since such reset circuitry is well known no further explanation thereof will be given.

*Memory address register 23.*—The memory address register 23 is the normal type of memory address register contained in conventional computing systems. The memory address register 23 contains the address of the memory location from which the utilization device 28 desires to read an information word or in which it desires to store an information word. The memory address register 23 can be set to any particular address by the utilization device 28 through cable 23B. Until changed by utilization device 28, the memory address register 23 emits on line 23A the last address set therein by utilization device 28. The output of memory address register 23 is connected by cables 23A, 67B and 71B to the input of gates 67 and 68. The memory address register 23 is conventional in design and since such circuitry is well known in the art no further explanation of the structure thereof will be given.

*Parity checking circuit 27.*—Parity checking circuit 27 receives eighteen bits of information from line 90B. These eighteen bits of information contain certain parity or redundancy bits. By comparing the condition of these parity or redundancy bits with the other bits in the particular word, parity checking circuit 27 determines whether or not certain of the information content of the word has been lost during the storage process. If parity checking circuit 27 determines that none of the information content of a word has been lost it activates line 27C and gates the word to utilization device 28 whereas if it finds that the information bits in a particular word and the parity bits do not conform, it activates line 27B. The particular number of parity or redundancy bits in each eighteen bit data word has not been specified and is not relevant to the present invention. Depending upon the particular application each data word may contain one or more parity or redundancy bits. Examples of parity codes which may be used are given in the next paragraph. Parity checking circuitry such as circuit 27 is well known in the art and no further explanation thereof will be given.

*Error correcting device 29.*—When parity checking circuit 27 determines that the parity bits and the information bits of a data word do not conform it activates line 27B thereby opening gate 89 and gating the data word to error correcting device 29. After the error in the data word has been corrected error correcting device 29 activates line 29A and supplies the corrected data word to OR circuit 88 over line 88A. The error correcting device 29 may be of any conventional type and the particular error correcting device used forms no part of the present invention. The error correcting device 29 may contain one or more of the following circuits; (1) A circuit which examines the redundancy bits and the data bits of the particular word and corrects the data bits according to some error correcting code. Many such codes are known in the computer art, for example, see "Multiple Error Correcting Codes by Means of Parity Checks" IRE Transactions on Information Theory, December 1958, page 145; or Error Correcting Codes by Peterson, published by the MIT Press (1961). (2) A circuit which controls a subroutine which programs the utilization device 28 such that the redundancy bits and the data bits of a particular word are examined and the data bits are corrected to conform to the redundancy bits. (3) Control circuitry which merely reverses the program of utilization device 28 until it arrives at the particular instruction which was responsible for producing the data which was stored in the particular memory location. The data word which was found to be incorrect is then regenerated. (4) Means by which the operator of the system can manually correct the data. The operator may also elect to change the redundancy bits and proceed operating the system with incorrect data. Such a procedure would naturally propagate the error; however, in certain problems this is tolerable. The function of any of the above described circuits is the same, to correct the incorrect data (or to change the redundancy bits such that the data appears to be correct which possibility will hereinafter also be referred to as correcting the data). After the data word has been corrected line 29A is activated and the data word as changed is supplied to storage register 22 via cable 88A, OR circuit 88, cable 88C and gate 91.

*Spare address counter 30.*—The spare address counter 30 is a normal type of binary counter circuit which emits a nine bit address. The counter 30 is initially set to the address of the register in memory 20 which is to be used as the first auxiliary memory register. Thereafter as each auxiliary memory register in memory 20 is used, the spare address counter is advanced one position by pulsing line 30A thereby causing the counter to emit the address of the next succeeding auxiliary memory register. The addresses from spare address counter 30 can either be gated through gate 61 or through gate 62. Spare address counter 30 is conventional in design and since such circuitry is well known in the art no further explanation of the structure will be given.

*Alternate address register 31.*—The alternate address register 31 is a normal nine bit register. A particular address may be set in alternate address register 31 from either lines 31A, 31B or 31C. The alternate address register 31 emits on line 31D the last address which had been set therein. The alternate address register 31 may be conventional in design and since such circuitry is well known in the art no further explanation of the structure thereof will be given. During normal operation of utilization device 28 the memory addressing circuit 21 is activated through gate 67 by memory address register 23, however, during certain control operations to be described later the memory addressing circuit 21 may be alternately activated through gates 64 or 68.

*Matching register access control 40.*—As previously described under certain conditions the address of a defective memory location and the address of the auxiliary memory location wherein the corrected information is stored are stored in a matching register. When the system attempts to access a defective memory location the address of which is stored in a matching register it is necessary to search each of the matching registers to find the one which contains the address of the defective memory location and then to read from the other half of the particular register the address of the auxiliary memory location wherein the corrected information is stored. Matching register access control 40 provides the control circuitry necessary to search the various matching registers to find the particular matching register which contains the address of a particular register; and also the circuitry necessary to assign a particular matching register to a particular defective memory location. The details of the matching register access control 40 are shown in FIGURE 6*a* and will be explained in detail later.

*Left parity check circuit 41 and right parity check circuit 42.*—Under certain conditions to be described in detail later the address of the auxiliary memory location wherein the corrected information is stored is stored in duplicate in the defective memory location. The address of the auxiliary memory location is stored once in the right hand nine bits of the defective register and once in the left hand nine bits of the defective register. A parity bit is provided for each of the sections of the register, i.e., parity bit 35 for the right hand section and parity bit 34 for the left hand section. When a previously tagged defective register (i.e., one in which the error bits are set to zero) is read out, bits ten to eighteen from the register are gated through gate 69 to left parity check circuit 41 and bits one through nine are gated through gate 70 to right parity check circuit 42. Parity check circuits 41 and 42 compare the eight address bits with the one parity bit to determine if the respective half of the register contains an accurate address, i.e., one where the address bits conform to the parity bit. Parity check circuits 41 and 42 respectively activate lines 41A and 42A when the parity of the information supplied on lines 41C and 42C does not check, and they respectively activate lines 41B and 42B when parity of the information on lines 41C and 42C does not check. Such circuitry is well known and no further explanation thereof will be given.

*Controls 43.*—The circuitry which activates the various gate circuits and which controls the timing of the various operations is represented in FIGURE 1*b* by the component labeled 43. As previously described for clarity of illustration all the lines from the control circuitry 43 to the various other circuits are not shown in FIGURES 1*a* and 1*b*. The details of the circuitry in control circuit 43 are shown in FIGURES 2*a*, 2*b*, 3*a*, 3*b*, 4, 5*a*, 5*b* and 5*c*. These circuits will be explained in detail later.

*Compare circuit 50.*—When the various matching registers are being searched to find the particular matching register which contains the address of a defective memory location, the address of the defective location is gated through gate 83 to line 50C and then to compare circuit 50 and the address from the right half of each matching register is gated through line 87B, gate 87 and line 87C to compare circuit 50. Compare circuit 50 activates lines 50A if these two addresses do compare and it activates 50B if these addresses do not compare. Such compare circuitry is well known in the art and no further explanation thereof will be given.

GENERAL DESCRIPTION OF SYSTEM OPERATION

The normal memory read and memory write operations (where no defective memory locations are encountered) will first be described. When utilization device 28 desires to store a word in a particular memory location it activates line 28C and transmits the word to be stored in memory over cable 88B and the address in which it desires to store the particular word over cable 23B. Line 28C is connected to lines 24A, 91A, 32B, 33B and 67A. Hence, the word to be stored in memory is gated through OR circuit 88 and gate 91 into storage register 22 and bit positions 32 and 33 are set to the "one" condition. The address in which the particular word is to be stored is transmitted to memory register 23 and from there through gate 67 and OR circuit 89 to the memory addressing circuitry 21. Activation of line 24A causes the memory control circuit to read the word in storage register 22 into the particular register in memory 20 specified by memory addressing circuitry 21. It should be particularly noted that during normal store operation the two error bits in the particular register in which a word is stored are set to the "one" condition.

When utilization device 28 desires to read a word from a particular location in memory 20 it activates line 28B and transmits the address from which it desires to read the word over cable 23B to memory address register 23. Line 28B is connected to lines 24B, 67A and 90A. The address from which utilization device 28 desires to read a word is therefore transmitted from memory address register 23 through gate 67 and OR circuit 89 to the memory addressing circuit 21. Activation of line 24B causes the memory control to read from memory 20 into storage register 22 the particular memory register the address of which is specific by memory address circuit 21. Once the register has been read from memory 20 into storage register 22 the information is gated through cable 22C and gate 90 into parity check circuit 27. Assuming that parity check circuit 27 finds that the parity of the information is correct it will activate line 27C thereby gating the word through cable 27D, cable 86A, gate 86, and cable 28D to the utilization device 28.

The previous paragraph described the read operation which occurs when the parity checking device 27 finds that the parity of the word read from the memory is correct thereby indicating that the word had been correctly stored by the memory 20. If parity checking circuit 27 determines that the data bits of a word do not conform to the parity bits of the word it activates line 27B thereby gating the word through cable 27D, gate circuit 89 and cable 29C to the error correcting device 29. Error correcting device 29 corrects the error either through error correcting circuitry, an error correcting subroutine or by operator intervention as previously described. Once the error has been corrected, error correcting device 29 activates line 29A and transmits the corrected data word via cable 88A, OR circuit 88, gate 91 (line 29A is connected to line 91A) and cable 22D into storage register 22.

The main feature of the present invention is directed towards taking the corrected information which is placed in storage register 22 and storing this information in an auxiliary register in memory 20. The defective memory location is then tagged by setting the two indicator bits 32 and 33 to the "zero" condition. The address of the particular memory location wherein the corrected information is stored is supplied by spare address counter 30.

The address of the particular auxiliary memory location wherein the corrected information is stored is referenced (in one of two ways which are described later) with the address of the defective memory location wherein the information was originally stored and, subsequently, when the utilization device 28 addresses the defective memory location, for example, through memory address register 23, the system automatically addresses the auxiliary memory location and reads the corrected information from the auxiliary memory location into storage register 22 without any intervention on the part of the computer program or the machine operator.

The reference between the defective memory location and the auxiliary memory register wherein the corrected information is stored is made in one of two ways. Either (a) the address of the auxiliary memory location is stored in the defective memory location or (b) the address of the auxiliary memory location is stored in a matching register with the address of the defective memory location. The mechanism through which (a) and (b) above are achieved will now be explained.

After a defective memory location is discovered and the corrected information is stored in an auxiliary memory location, an attempt is made to store in the defective memory location the address of the auxiliary memory location in which the corrected information has been stored. Since the address of a memory location consists of half as many bits as there are bit positions in each memory register, the address of the auxiliary memory location wherein the corrected information is stored can be placed in the defective register in duplicate, once in the right half of the register and once in the left half of the register. Since the defective memory location probably only has a small number of defective bit positions, there is a high probability that either the right half or the left half of the defective register does not have any defective bit positions and that one of them can store the address of the auxiliary memory location. Separate parity bits 34 and 35 are provided to check each half of the register wherein the address of the auxiliary location is placed. Immediately after the auxiliary address is stored in the defective location it is read from the defective register and the parity bits 34 and 35 are tested by parity checking circuits 41 and 42. If one of the parity bits 34 or 35 checks, one of the lines 41B or 42B is activated to indicate that the defective memory register has enough operable bit positions to store the address of the auxiliary memory location wherein the corrected information is stored and the address is restored in the defective location and the machine proceeds with its normal sequence of program steps. The next time that the particular defective register is accessed by the utilization device 28 the error indicator bits 32 and 33 indicate that the information stored therein is not a data word. The system therefore interprets the information in the defective memory register as the address of an auxiliary memory location and if one of the parity bits 34 or 35 checks, the system automatically addresses the auxiliary memory register whose address is stored in the defective location and the system reads the correct information from the auxiliary memory register and proceeds with its program in the normal manner.

If a defective memory location does not contain a sufficient number of operable bit positions to store the address of the auxiliary memory location, neither of the parity bits 34 or 35 will check when the address of the auxiliary memory location is reread from the defective memory location immediately after it is stored therein. In such a case the address of the auxiliary memory location is stored in another special segment of the main memory 20 which comprises a plurality of registers which are used as matching registers.

Two addresses are stored in each matching register, the address of a defective memory location is stored in the right half of each matching register and in the left half of each matching register the address of the auxiliary memory location (which contains the corrected information from the particular defective memory location whose address is contained in the right hand side of the same matching register) is stored.

As will be explained in detail later, matching register access control 40 has the ability to sequentially supply the address of the various matching registers to the memory addressing circuit 21, thereby sequentially addressing memory 20 to the matching registers. Hence, when the system wants to find the particular matching register which contains the address of an auxiliary location that contains the corrected information from some defective register, the information from the various matching registers is sequentially read from the memory 20 and the right half of each matching register is gated to compare circuit 50. Circuit 50 compares the address contained in the right half of the various matching registers to the address of the defective memory location then being indexed by the utilization device 28 through memory address register 23. When a match is found, it is an indication that the left half of the particular matching register contains the address of the auxiliary memory location wherein the corrected information is stored. Once this particular matching register has been located, the memory is addressed to the address contained in the left half of this particular register (that is to the appropriate auxiliary memory location in which the corrected information is stored) and the corrected information is read out into the storage register 22. The utilization device 28 can then proceed with its normal sequence of operations.

The system will now be described by describing the various sequences of operations which the system performs. There are two major control sequences, each of which is divided into two minor control sequences, hence, there are four separate sequences of operations which the system performs. The first major control sequence which includes the first two minor control sequences relates to the detection of a defective memory location, the correction of the information previously stored in the defective memory location, the storage of the corrected data in an auxiliary memory location and the storage of the address of this auxiliary memory location either in the defective memory register itself or in one of the matching registers.

The second major control sequence which includes the third and fourth minor control sequences relates to the sequence of operations that occurs when the system subsequently addresses a memory location which has previously been found to be defective. If upon reading out any particular register in the memory 20, the system finds that the error bits 32 and 33 are set to "zero" (thereby indicating that this register had previously been found to be defective and that information supposedly stored therein is now stored in some auxiliary memory location) the system automatically addresses the auxiliary memory location wherein the corrected information is stored. The address of the auxiliary memory location wherein the corrected data is stored is obtained from either the defective memory location or from one of the matching registers as required.

As previously explained each of the major control sequences includes two possible minor control sequences. The various minor control sequences are defined below.

*First minor control sequence.*—The first minor control sequence relates to the sequence of operations that occurs when a particular memory register is found to be defective and when such register has sufficient operable bit positions to store the address of the auxiliary memory location therein.

*Second minor control sequence.*—The second minor control sequence relates to the sequence of operations which occurs when any particular memory register is found to be defective and when the defective memory location does not have sufficient operable bit positions to store the address of an auxiliary memory register thereby requiring that the address of the auxiliary memory location be stored in one of the matching registers.

*Third minor control sequence.*—The third minor control sequence relates to the particular sequence of operations that occurs when a memory register is addressed wherein both of the error bits 32 and 33 are set to "zero" (thereby indicating that the particular register had previously been found to be defective) and wherein one of the parity bits 34 or 35 indicates that one of the sections of the defective memory location does contain the address of the auxiliary memory location wherein the corrected information is stored.

*Fourth minor control sequence.*—The fourth minor control sequence relates to that sequence of operations which occurs when a memory register is addressed wherein both of the error bits 32 and 33 is set to "zero" thereby indicating that the particular register had been previously found to be defective and that the information supposedly stored therein is stored in an auxiliary memory location, and wherein the parity bits 34 and 35 indicate that the information contained in the defective register is not the address of the auxiliary memory location, thereby necessitating that the system search the matching registers to find the particular matching register which contains the address of the defective memory register and the address of the auxiliary memory register wherein the corrected information is stored.

Each possible sequence of operations will now be set forth in detail; however, a detailed explanation of the circuitry will be deferred until later.

*First major control sequence.*—During the normal operation of utilization device 28 and memory 20, the utilization device 28 through memory address register 23 supplies addresses to the memory addressing circuit 21, thereby addressing various registers in the memory 20. The information from the particular registers which are addressed is read in conventional manner into storage register 22 and from register 22 to parity checking circuit 27 and thence through gate 32 and OR circuit 33 to the utilization device 28. If parity checking circuit 27 indicates that the information read from the memory is correct the operation of memory 20 proceeds in the normal manner under control of utilization device 28 without any intervention by the system of the present invention. If, however, parity checking circuity 27 indicates that the parity of redundancy bits and the information bits of a word read from a memory register do not conform, the parity checking circuit 27 activates line 27B instead of line 27C, thereby gating the (incorrect) data to the error correcting device 29. Error correcting device 29 which operates as previously described then corrects the data. Once the data has been corrected it is entered into storage register 22 via cable 88A, OR circuit 88, gate 91 and cable 22D, and errror correcting device 29 generates a signal on line 29A to initiate the first major control sequence of operations. The first major control sequence includes the following steps:

(1) The spare address counter 30 is activated to emit the address of the first auxiliary memory location. The address from spare address counter 30 is gated to the alternate address register 31 and from there to the memory addressing circuit 21 which addresses the memory to the particular address emitted by the spare address counter 30. Bit positions 32 and 33 in register 22 are set to the "one" condition (the error bit positions in the auxiliary memory location are hereby set to the "one" condition during step 2).

(2) The information in storage register 22, the corrected information word, is read into the auxiliary memory location which was addressed in step one above.

(3) The address from the spare address counter 30 is gated to cables 22A and 22B thereby placing the address of the auxiliary memory location in register 22 "in duplicate," the error indicator bits 32 and 33 are set to "zero" and the content of the memory address register 23 is gated to the memory adressing circuit 21 (thereby addressing the memory 20 to the defective memory register initially addressed at the beginning of the sequence).

(4) The informaiton from storage register 22 is read into the defective memory location and then the bit positions of storage register 22 are reset to zero.

(5) The gating of the address from memory address register 23 to the storage selection circuitry 21 is continued (thereby addressing the memory to the address of the defective memory register) and the information from the defective memory register is read into the storage register 22.

(6) The information from each half of storage register 22 is gated to the respective parity checking circuits 41 and 42 and a determinaiton is made if the parity of either half of the storage register checks with the parity bits in the locations 34 and 35.

NOTE: The following operations designated 7*a*, 8*a* and 9*a* constitute the first minor control sequence and these operations only take place if the parity checking circuit 41 actuates line 41B or if parity checking circuit 42 activates line 42B to indicate that the parity of the information bits read from the right or the left section of the storage register 22 checks with the parity information stored in bits 34 and 35.

7*a*. The gating of the address from the memory address register 23 to the memory addressing circuit 21 is continued (thereby adressing the memory 20 to the defective memory register) and the information contained in storage register 22 (i.e., the address of the auxiliary memory register in duplicate) is stored in the defective memory location.

8*a*. The address from the alternate address register 31 (i.e., the address of the auxiliary memory location wherein the corrected data was stored) is gated to memory addressing circuits 21 thereby addressing memory 20 to the location wherein the corrected data is stored.

9*a*. The information from the auxiliary memory location is read onto storage register 22 and after a slight delay the triggers in the control circuitry are reset thereby terminating the first major control sequence and conditioning the system to proceed with the regular program of the utilization device 28.

NOTE: If after step 6 above neither parity bit 34 nor 35 checks, the system performs the following sequence of operations rather than steps 7*a* to 9*a* above. This sequence is designated as the second minor control sequence.

7*b*. The address from the spare address counter 30 is gated into the left half of storage register 22; the address from memory adress register 23 is gated into the right half of the storage register 22; and the address of a matching register is gated from matching register access control 40 to memory addressing circuit 21 thereby addressing memory 20 to one of the matching registers (the details of the matching registers access control 40 are given later). Bit positions 32 and 33 in register 22 are set to the "one" condition so that the error bit positions in the matching register will be set to the "one" condition during step 8*b* below.

8*b*. The information which is in storage register 22 is stored in the matching register specified by matching register access control 40.

9*b*. The address from alternate address register 31 is gated to the memory addressing circuit 21, thereby adressing memory 20 to the auxiliary memory location wherein the correct data was stored in operation two above (and as will be explained later, the write counter in the matching register access control circuit is advanced one position.)

10*b*. The information from the auxiliary memory location is read into storage register 22 and after a slight delay the triggers in the control circuitry are reset and utilization device 28 proceeds with the regular program.

*Second major control sequence.*— The second major control sequence encompasses those operations which occur when during normal operation of the utilization device 28, utilization device 28 causes a selected word to be read from the memory 20 and it finds that the word read from the particular location has both of its error bits 32 or 33 set to the "zero" condition. The fact that the error bits are set to the "zero" condition indicates that this particular memory register has been previously found to be defective and that the information word supposedly stored in this register is stored in some auxiliary memory register. As previously stated the second major control sequence includes the third and fourth minor control sequences.

The following steps occur each time the utilization device 28 addresses a register in memory 20 (through memory address register 23 and memory addressing circuit 21) and after reading the addressed memory register into storage register 22 it finds that both of the bits of the word in error bit positions 32 and 33 are set to "zero."

(1) The right half of the word in memory register 22 (i.e., bit positions one to nine counting from the right) is gated to parity checking circuit 42 and the left half of the word in memory register 22 (i.e., bit positions ten to eighteen counting from the right) is gated to parity checking circuit 41. If the parity of the right-hand section of the register checks, line 42B is activated and if the parity of the left-hand section of the register checks, line 41B is activated. If the parity of a section of the register does not check the respective line 41A or 42A is activated.

NOTE: If after step one above either of the lines 41B or 42B is activated (if the parity of the left half or the right half of the register checks) the following sequence of operations occurs. This sequence is designated as the third minor control sequence.

2*a*. The address in that half of the storage register 22 for which the parity bit checks is gated through cable 22E or 22F and cable 31A or 31B to the alternate address register 31 and from there to the memory addressing circuit 21 thereby addressing memory 20 to the register whose address is specified in that section of the storage register 22, for which the parity checks (i.e., the auxiliary memory location wherein the corrected information is stored).

3*a*. The memory location addressed step 2*a* above is read into storage register 22.

4*a*. The triggers in the control circuits are reset and utilization device 28 proceeds with the normal operation.

NOTE: If, after step 1 above, neither the line 41B nor line 42B is active it indicates that the address of the auxiliary memory location wherein the corrected information is stored is contained in one of the matching registers and that the address of the defective memory location is stored in the same matching register. The following sequence of operations designated as a fourth minor control sequence therefore occurs.

2*b*. The address from the memory address register 23 (i.e., the address of the defective memory location) is gated to the comparing circuit 50.

3*b*. (The following is the searching operation.) The various address matching registers are sequentially addressed and read into storage register 22 under control of matching register access control 40. After each address matching register is read into register 22 the nine bits in the right hand section of the register are gated to compare circuit 50 and compared with the address in the memory address register 23. This operation proceeds until a match is found. This operation will be explained in detail later; however, for present purposes it can be assumed that at the end of this operation the storage register 22 will contain the address of the defective memory location in its right hand half and the address of the auxiliary memory location where the corrected information is stored in its left hand half.

4*b*. The information from the left hand section of the register 22 (bits ten to eighteen counting from the right which comprises the address of the auxiliary memory location and which contains the corrected information) is gated to the alternate address register 31 and from there to memory addressing circuit 21.

5*b*. The information contained in the particular memory register addressed in the previous step is read into storage register 22.

6*b*. The triggers in the control circuit are reset and utilization device 28 proceeds with its normal program.

It should be noted that when utilization device 28 is using the memory 20 in the normal manner a memory read cycle always precedes a memory write cycle. Hence, once a memory location has been found to be defective, and it has been tagged by setting the error bits 32 and 33 to the "zero" condition, if an attempt is later made to write a new data word into the particular memory location, the fact that the location is defective is detected during the read cycle which precedes the write cycle.

The fact that the error bits are set to the "zero" condition initiates a second major control sequence of operations, thereby addressing the computer to the auxiliary member location previously assigned to store corrected information from the defective memory location. In the situation where utilization device 28 is attempting to write into a defective memory location, it instead writes into the auxiliary memory location after it has been referenced there by the operation of a second major control sequence of operation.

DETAILED DESCRIPTION

Figures 1, 1A:
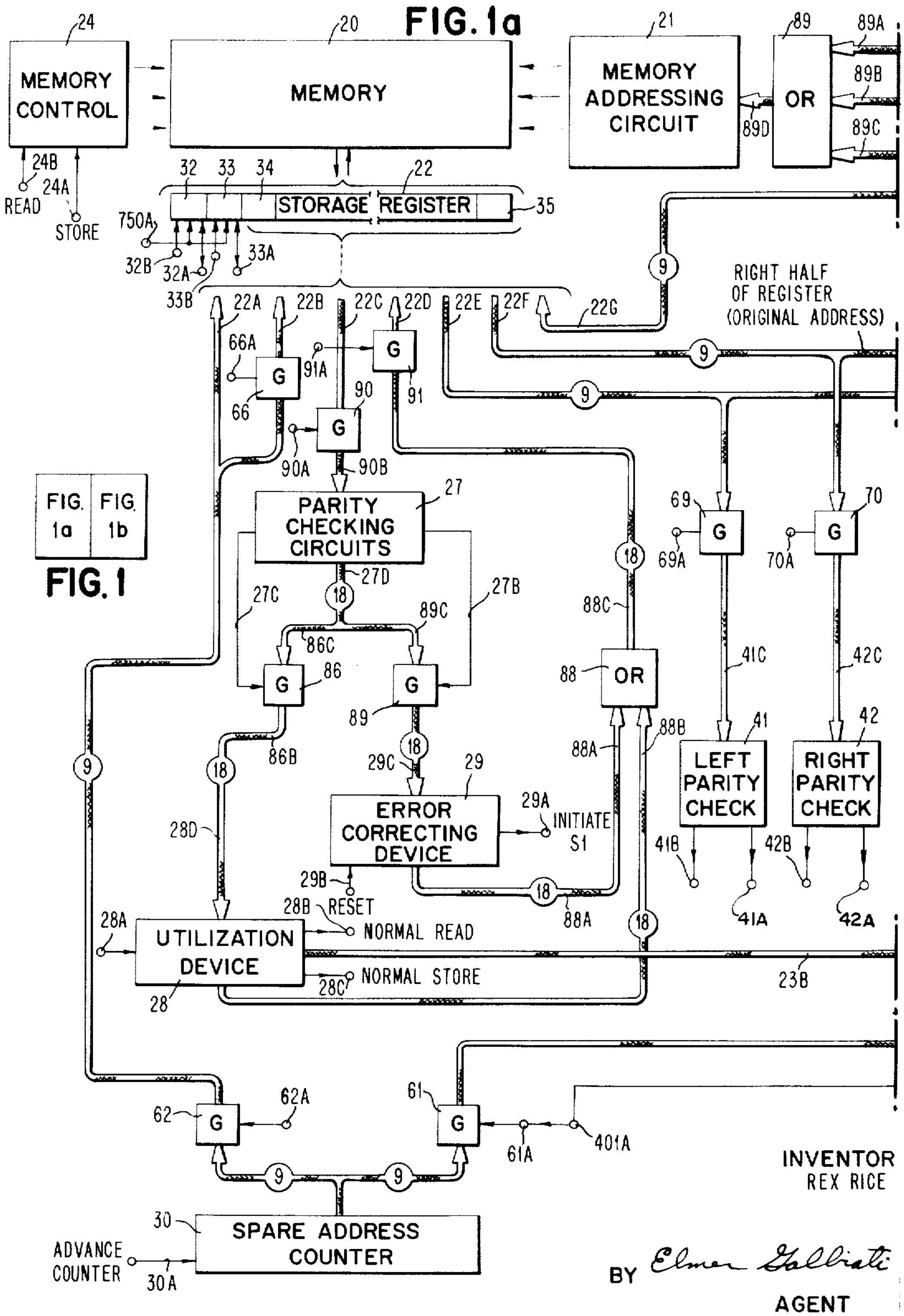
Figure 1B:
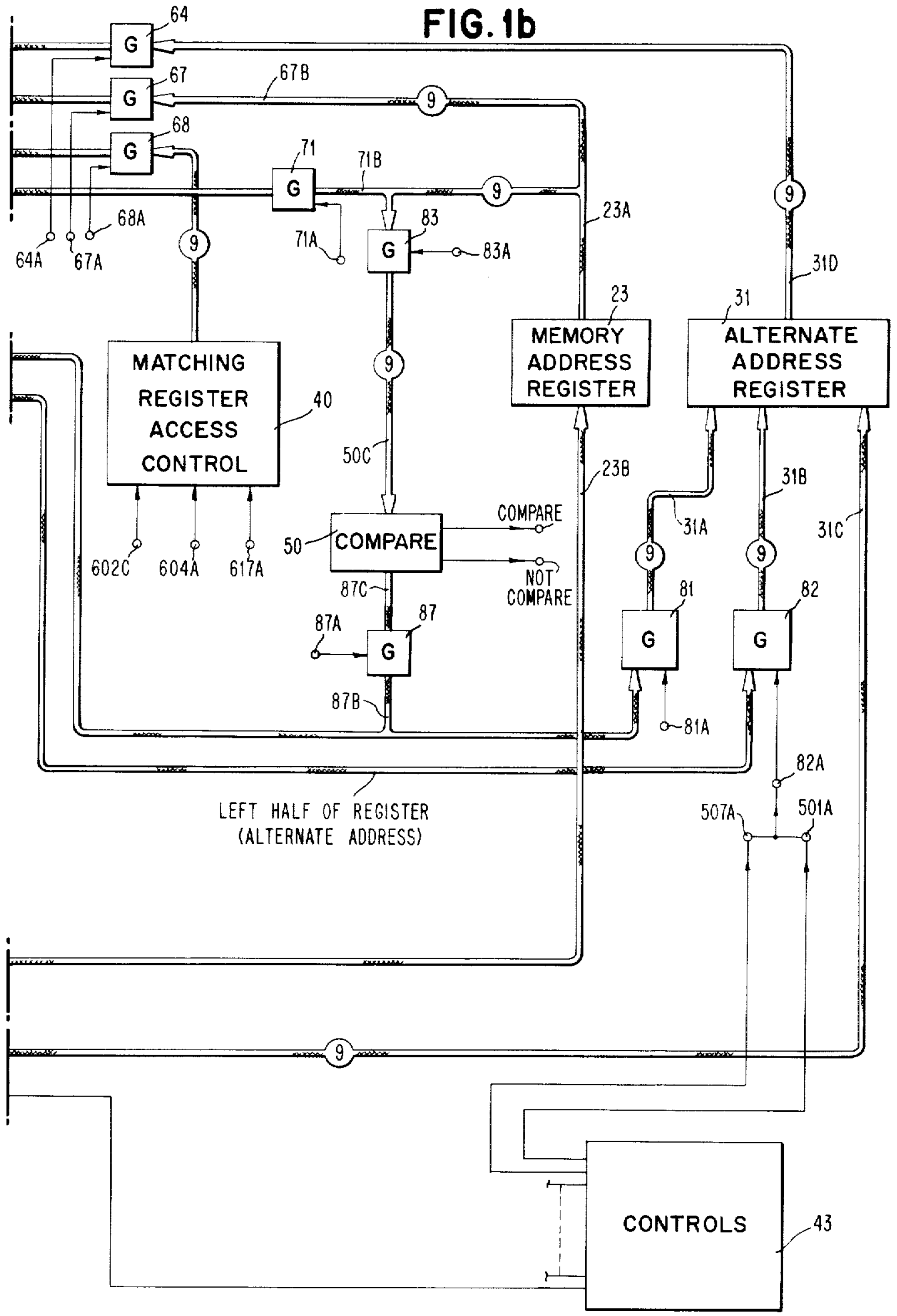

The details of certain of the circuits shown in block form in FIGURES 1*a* and 1*b* and the details of the manner in which the various sequences of operations are controlled will now be explained. For ease of reference the interconnections between the various circuits in all of the figures except FIGURES 1*a* and 1*b* are tabulated below. The connections to the various circuits shown in FIGURES 1*a* and 1*b* are tabulated in FIGURE 1*c*.

| To— | From |
|---|---|
| **201A** | 32A. |
| **201B** | 33A. |
| **202A** | 29A. |
| **211A** | 41B. |
| **211B** | 42B. |
| **233A** | 42B. |
| **233B** | 41B. |
| **261A** | 32A. |
| **262A** | 33A. |
| **263A** | 28B. |
| **315A** | 235C. |
| **315B** | 203C. |
| **317B** | 50A. |
| **340A** | 236C. |
| **401B** to **413B** | 203C. |
| **407C** to **409C** | 208C. |
| **410C** to **413C** | 209C. |
| **414B** | 413A. |
| **415B** | 409A. |
| **501B** | 42B. |
| **501C** to **504C** | 236C. |
| **502B** | 42B. |
| **503B** | 41B. |
| **504B** | 41B. |
| **505B** to **508B** | 237C. |
| **509B** | 502A. |
| **510B** | 504A. |
| **602C** | 411A. |
| **604A** | 410A. |
| **617A** | 506A. |
| **617B** | 50B. |
| **650B** | 50A. |
| All reset lines | 414A, 415A, 509A, 510A. |

| From— | To |
|---|---|
| **203C** | 28A, 315B, 401B to 413B, 630A. |
| **208C** | 407C to 409C. |
| **209C** | 410C to 413C. |
| **235C** | 28A, 69A, 70A, 315A. |
| **236C** | 340A, 501C to 504C. |
| **237C** | 505B to 508B. |
| **401A** | 61A, 64A, 32B, 33B. |
| **402A** | 24A. |
| **403A** | 62A, 66A, 67A. |
| **404A** | 24A. |
| **405A** | 24B. |
| **406A** | 69A, 70A. |
| **407A** | 24A. |
| **408A** | 64A. |
| **409A** | 24B, 415B, 90A. |
| **410A** | 62A, 68A, 71A, 604A, 32B, 33B. |
| **411A** | 24A, 602C. |
| **412A** | 64A. |
| **413A** | 24B, 414B, 90A. |
| **414A** | 29A, 30A, all reset lines. |
| **415A** | 29B, 30A, all reset lines. |
| **501A** | 64A, 82A. |
| **502A** | 24B, 509B, 90A. |
| **503A** | 64A, 81A. |
| **504A** | 24B, 510B, 90A. |
| **505A** | 83A. |
| **506A** | 617A. |
| **507A** | 64A, 82A. |
| **508A** | 24B, 90A. |
| **509A** | All reset lines. |
| **510A** | All reset lines. |
| **640A** | 87A, 24B. |
| **650C** | 63A. |

Figure 2A:
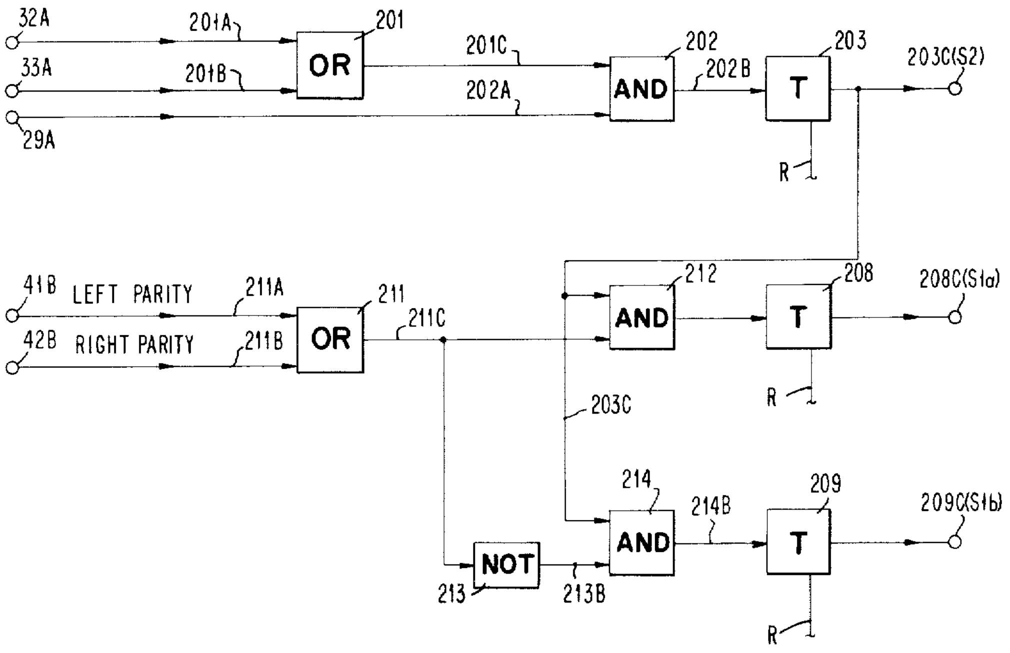
Figure 2B:
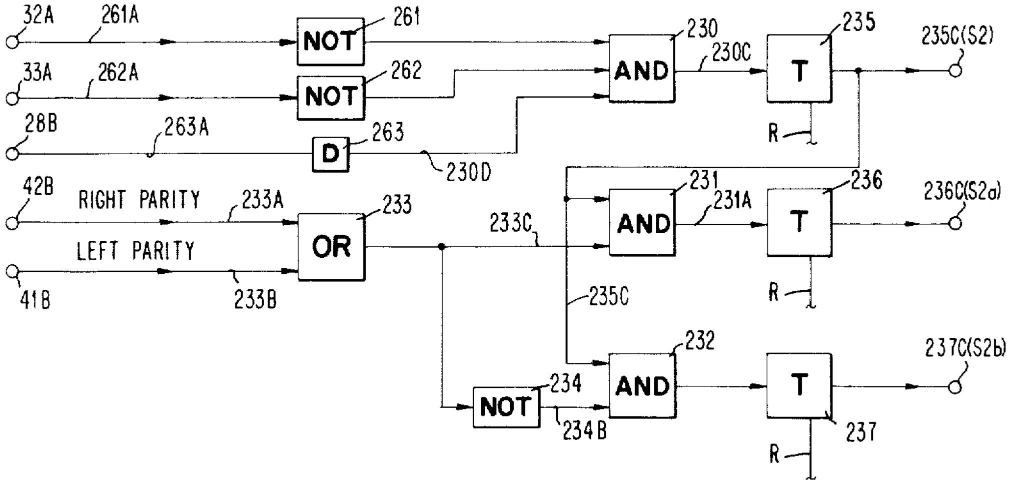

*Sequence initiating circuitry* (*FIGURES 2a and 2b*).—The circuitry shown in FIGURES 2*a* and 2*b* is a part of control circuit 43 shown in FIGURE 1*b*. The circuitry shown in FIGURE 2*a* is the circuitry which initiates the first major control sequence of operation. This circuitry consists of OR circuit 201, AND circuit 202 and trigger 203. The inputs to the circuit consists of line 201A which is connected to terminal 32A, line 202B which is connected to terminal 33A and line 202A which is connected to terminal 29A. Trigger 203 is set to the "one" condition thereby activating line 203C and initiating the first major control sequence of operations whenever either or both of the error bits 32 and 33 are in the "one" condition, thereby producing a voltage on line 201C, and at the same time line 202A is active (note, circuit 29 activates terminal 29A after the information which was previously found to be incorrect has been corrected).

The circuitry which initiates the first and second minor control sequences is also shown in FIGURE 2*a*. It consists of NOT circuit (inverter) 213, AND circuits 212 and 214, OR circuit 211, and triggers 208 and 209. The circuits input consists of line 203C which is active after trigger 203 is switched (i.e., after the first major control sequence has started), line 211A which is connected to terminal 41B and line 211B which is connected to terminal 42B. Trigger 208 is set to the "one" condition thereby activating line 208C and initiating the first minor control sequence whenever trigger 203 is set to the "one" condition and at the same time either the parity of the information in the right section of the memory register 22 or the parity of the information in the left section of the memory register 22 checks (indicated by a signal on line 211C). Trigger 209 is set to the "one" condition thereby activating line 209C and initiating the second minor control sequence of operation whenever trigger 203 is set to the "one" condition and at the same time the parity of the data in neither the right nor the left section of the memory register 22 checks (as indicated by a signal on line 213B).

The circuitry which activates the second major control sequence and the third and fourth minor control sequences is shown in FIGURE 2*b*. This circuitry consists of AND circuits 230, 231 and 232, OR circuit 233, NOT circuits 234, 261 and 262, delay circuit 263 and triggers 235, 236 and 237. The input to the circuit consists of lines 261A which is connected to terminal 32A, line 262A which is connected to terminal 33A, line 263A which is connected to terminal 28B, line 233A which is connected to terminal 42B and line 233B which is connected to terminal 41B.

Trigger 235 is set to the "one" condition thereby activating line 235C and initiating a second major control sequence of operations whenever the utilization device 28 is performing a read operation (indicated by a signal on line 28B) and after the word has been read from memory 20 into storage register 22 the error bits 32 and 33 are set to the "zero" condition. The delay circuit 263 introduces sufficient delay into the signal from line 28B such that the error bit positions 32 and 33 in register 22 have time to be set by the word read from the memory. If, after the word is read from memory the error bits 32 and 33 are not set to the "one" condition AND circuit will be activated producing a signal on 233 and set trigger 235 to the "one" condition thereby activating output 235C. Trigger 236C is set to the "one" condition thereby activating output 236C and initiating a third minor control sequence whenever trigger 235 has been set to the "one" condition as indicated above and at the same time either the parity of the right section of the data word or the left section of the data word checks (as indicated by a signal on lines 233C). Trigger 237 is set to the "one" condition thereby activating output 237C and initiating a fourth minor control sequence of operations whenever trigger 235C has been set to the "one" condition and at the same time neither the parity of the right section of the data word nor the left section of the data word checks (as indicated on line 234B).

For ease in explanation the output terminals 203C, 208C, 209C, 235C, 236C and 237C are alternately referred to as lines S1 S1*a,* S1*b,* S2, S2*a* and S2*b* respectively to designate the sequences with which they are associated. The lines to which terminals 203C, 208C, 209C, 235C, 236C and 237C are connected is tabulated in the previously given Table II.

It should be noted that lines 203C and 235C are connected to line 28A, the activation of line 28A suspends the operation of utilization device 28. Hence, whenever the supplemental control circuitry of the present invention is activated to initiate a control sequence the normal operation of utilization device 28 is suspended until the supplemental control circuitry has completed the required sequence of operations and the various triggers are reset.

Figure 6A:
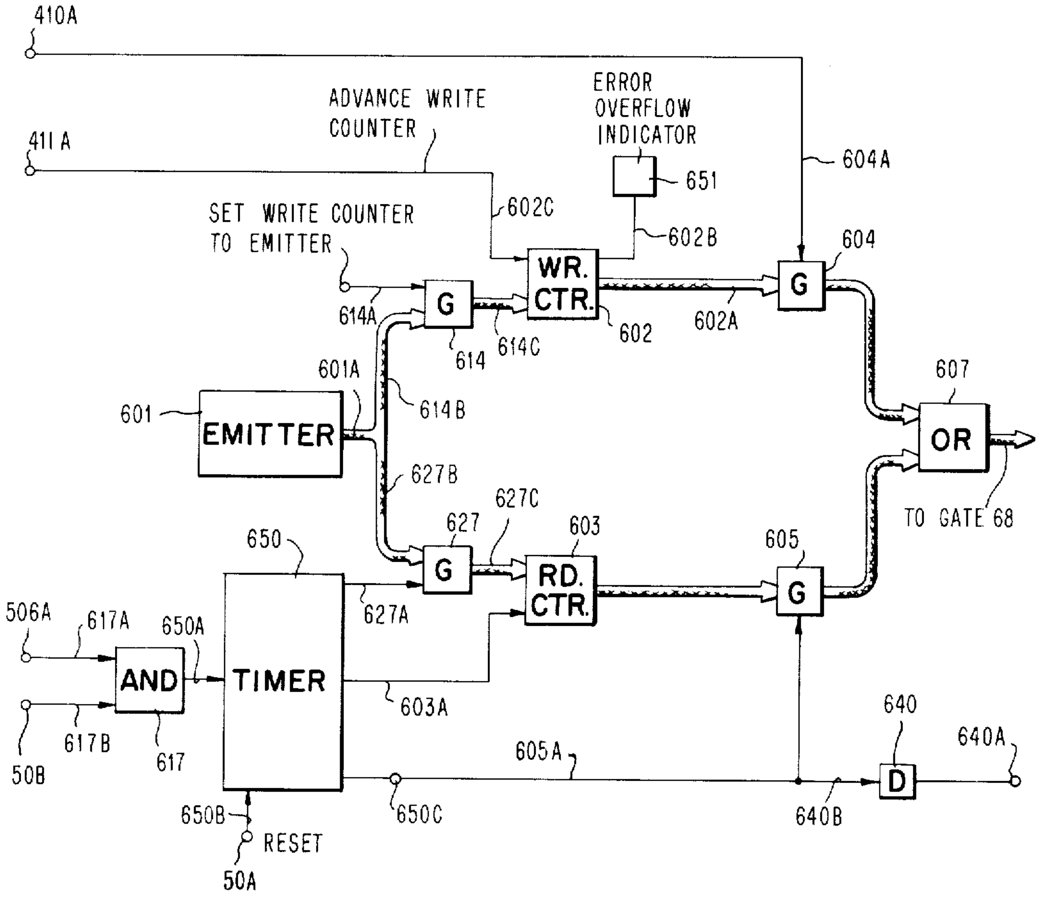

*Matching register access control 40.*—The matching register access control circuitry 40 (shown in detail in FIGURE 6*a*) performs the following functions: First, when during a first major control sequence the defective memory location is found not to contain sufficient operable bits to store the address of the auxiliary memory location, the matching register access control circuitry 40 emits an address through gate 604 to OR circuit 607, to gate 68 and finally to the memory addressing circuit 21 to address memory 20 to a matching register wherein both the address of the defective memory location and the address of the auxiliary memory location can be stored (a second minor control sequence). Second, when the system interrogates a defective memory location and it finds that the defective register does not contain the address of the auxiliary memory location wherein the corrected information is stored, the matching register access control 40 emits the address of the matching register and the register searches the matching registers to find the one which contains the address of the defective memory location. Matching register access control 40 emits the addresses of matching registers through gate 605 to OR circuit 607, to gate 68, and finally to memory addressing circuit 21 to address memory 20 to the various matching registers. The right section of each matching register is read out into the compare circuit 50 which determines whether the particular matching register which is read contains the address of defective memory location in its right section. If the address matching register which is read is found to contain the address of the defective memory location, this same matching register is known to contain the address of the auxiliary memory location wherein the corrected information is stored in its left section. The address of the auxiliary memory location is gated to memory addressing circuit 21 and the corrected information is read from the auxiliary memory location (a fourth minor control sequence).

During the second operation described above the matching register access control circuitry 40 does not merely emit the addresses of the various matching registers in sequence. Instead, in order to decrease the time required for the search it first emits the address of the matching register which most probably contains the desired information. The manner in which this is accomplished will be explained in detail later. After it has emitted this first address which is the address of the register which most probably contains the desired address, it sequentially emits the address of the other various matching registers starting from the matching register which has the lowest numerical address.

As previously described during the third step in the fourth minor control sequence the system searches the matching registers to find the particular matching register which contains the address of the defective memory location then being addressed by utilization device 28. The first matching register which the system tests to see whether or not it contains the address of the defective memory location is the particular matching register which contains the address of the defective memory location which the computer indexed at the preceding activation of a fourth minor control sequence of operations. The concept bethind this is that the defective memory register which was last indexed is known to contain information which is currently in use by the computer and, hence, there will be a greater probability that the computer will be reaccessing this same information rather than some entirely different information and, hence, no search of the matching registers is required.

For example, the memory location wherein one of the instructions of a subroutine is stored may be defective and the corrected information may be stored in one of the auxiliary memory locations and the address of the auxiliary location stored in one of the matching registers. All of the other memory locations wherein the other instructions of the particular subroutine are stored may be operable. The utilization device may now be operating upon a problem which requires the repeated use of this particular subroutine. Hence, each time the system indexes the defective memory location and the system goes to the matching registers, the system will not have to search the matching register starting at a random location. Instead on first try the system will search the matching register last found to contain the desired address.

Figure 6B:
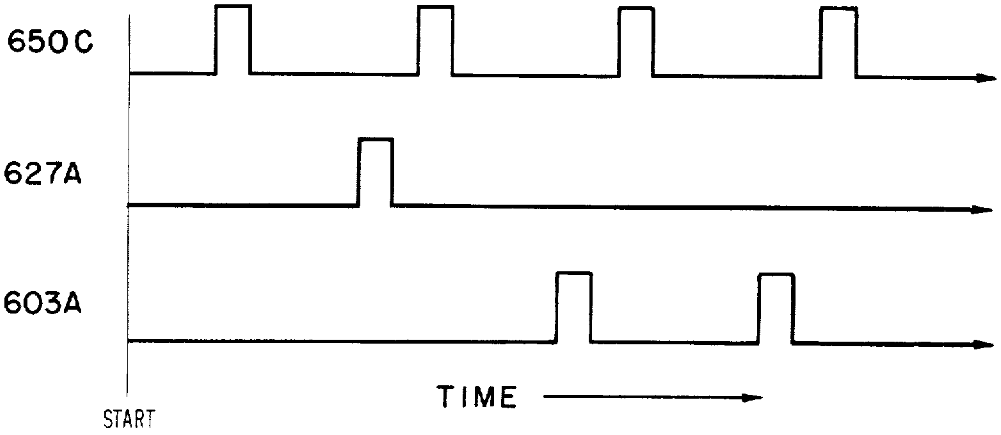

The matching register access control 40 has three circuits therein which can emit addresses; these are, the emitter 601, the write counter 602, and the read counter 603. The write counter 602 can be set to the address emitted by the emitter 601 through the gate 614 and the read counter 603 can be set to the address emitted by the emitter 601 through the gate 627. The address emitted by the write counter can be gated to the memory selection circuitry 21 through gate 604, OR circuit 607, and gate 68 and the address emitted by read counter 603 can be gated to the memory selection circuitry 21 through the gate 605, OR circuit 607 and gate 68. The write counter 602 and the read counter 603 are conventional eight digit binary counters. Write counter 602 can be incremented one position at a time by pulses on line 602C and read counter 603 can be incremented one position at a time by pulses on line 603A. After the counter 602 has exceeded a certain count it activates line 602B thereby activating an overflow indicator 651. The operation of read counter 603 is controlled by a timer 650. The timer 650 is activated by AND circuit 617 through line 650A. The time relationship of the pulses which the timer 650 produces is shown in FIGURE 6*b*.

The address which the emitter 601 emits specifies the address of the particular memory register which is to be used as the first matching register. That is, the first time the system goes through a second minor control sequence it will place the address of the defective memory register which initiated the sequence and the address of the auxiliary memory register assigned to the particular defective memory register in the memory register whose address is emitted by emitter 601. This is accomplished by activating gate 614 by a pulse on line 614A prior to the time that the system has gone through any second minor control cycles. Activation of the gate 614 gates the address from emitter 601 to the write counter 602. Thereafter when the system goes through a second minor control sequence it uses the address in write counter 602 as the address of the matching register. The write counter 602 is incremented one position by a pulse on line 602C after each second minor control sequence. Hence, after each second minor control sequence the write counter 602 contains the address of the next register which is to be used as a matching register.

As previously explained, the matching register access control 40 also sequentially emits the addresses of the various matching registers during each fourth minor control sequence. Read counter 603 performs this function. At the beginning of each fourth minor control sequence lines 617A and 617B are activated (in a manner to be described) thereby activating AND circuit 617 and line 650A. Activation of line 650A starts timer 650 and the timer 650 produces a series of pulses on lines 627A, 603A and 605A. The time relation of the pulses produced on lines 627A, 603A and 605A, is shown in FIGURE 6*b*.

The timer 650 first activates line 605A which gates the address initially in read counter 603 through gate 605, next the timer activates line 627A which activates gate 627 and gates the output of emitter 601 into the read counter 603, thereby setting the read counter to the address emitted by the emitter, next the timer activates line 605A which gates this address through gate 605. The read counter 603 is next incremented one position by a pulse on line 603A and then the new address thereby produced is gated through gate 605 by a pulse on line 605A. Thereafter the read counter 603 continues to be incremented by pulses on line 603A each new address being gated through gate 605. The read counter 603 continues to be incremented until the AND circuit 617 is disabled by the removal of a signal from line 617B. The removal of the signal from line 617B occurs when the particular matching register which contains the desired address is found. In this manner at the end of each fourth minor control sequence the read counter 603 will continue to hold the address of the particular matching register which contains the address of the defective memory location then being sought. At the beginning of the succeeding fourth minor control sequence, the first address that is gated to the memory selection circuitry is the address left in read counter 603 at the end of the preceding search. Thus, as previously explained the particular memory register which is first searched is that matching register which is most likely to contain the desired information.

The output terminal 650C of timer 650 activates (in addition to line 605A) input 640B of delay circuit 640 and the control line 68A of gate 68. The output 640A of delay circuit 640 activates the read line 24B of memory control 24. Hence, the addresses emitted by memory register access control 40 are gated to the memory addressing circuitry 21 through gate 68 and after the memory 20 is addressed to the appropriate register, the register is read and the content of its right hand section is gated to compare circuit 50. The time delay between the pulses emitted by timer 650 and the delay introduced by circuit 640 is long enough to allow all of the required operations to occur. Reset line 650B of timer 650 is activated by line 50A from compare circuit 50, hence, when the desired matching register is found line 50A immediately resets the timer 650.

Line 614A is only activated when one desires to reuse the matching registers which have been previously used. The activation of line 614A resets the write counter 602 to the address specified by the emitter 601.

As previously described there are no particular registers in memory 20 which are unchangeably designated as matching registers. Any segment of memory 20 can be designated as that containing the matching registers by placing the lowest numbered address of the segment of memory 20 which one desires to use for matching registers in emitter 601.

It should be noted that the addresses emitted by emitter 601, write counter 602 and read counter 603 are eight digit addresses. However, they also have a one digit parity bit. Emitter 601 emits this parity bit and write counter 602 and read counter 603 generate the parity bit in accordance with the particular address at which they are then set.

Timer 300.—The circuitry which generates the timing pulses which control the various operations during each of the major control sequences is shown in FIGURE 3. The timer 300 is part of control circuitry 43. The circuit is a conventional ten position ring circuit with a few added controls. The timer has ten triggers 301 to 310 each of which has a reset line designated by the numeral which designates the trigger followed by a capital R (for example, line 301R resets trigger 301) an output line designated with the numeral that designates a particular trigger followed by a capital A, for example 301A, and a set line designated by the numeral which designates a particular trigger followed by a capital S, for example 301S. The output lines 301A to 310A are also alternately designated by the letter T followed by the number of the stage to facilitate reference to the various time periods.

Figures 3A, 3B:
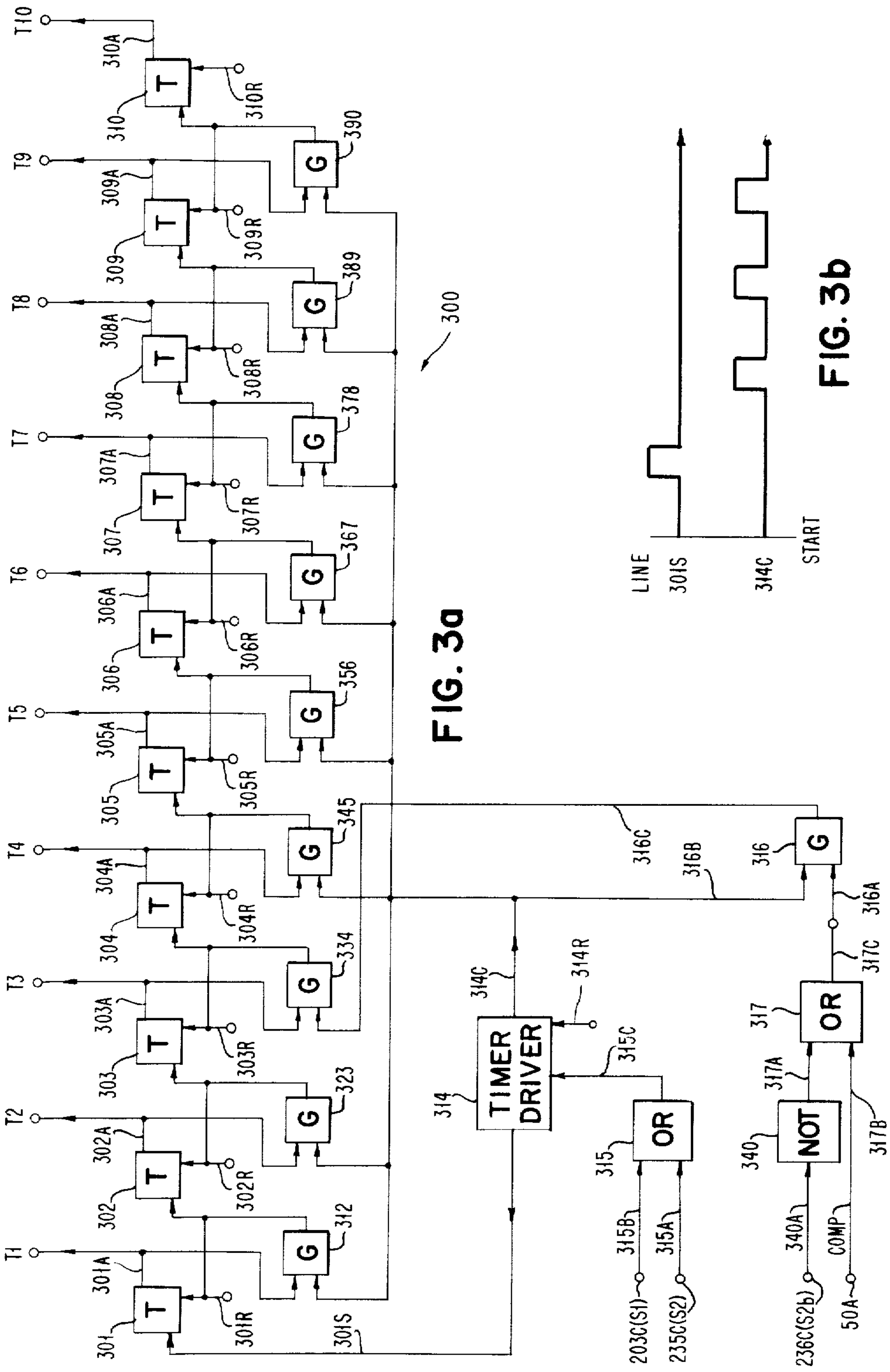

The timer is driven by timer drive circuit 314. Timer drive circuit supplies appropriately timed pulses on lines 301S and 314C after it has been activated by line 315C. The timing of the pulses emitted by timer drive circuit 314 is shown in FIGURE 3*b*. After the timer is activated by a pulse on line 315C it first supplies one pulse on line 301S and later supplies a continuous series of pulses on line 314C. The timer drive circuit is reset by the activation of line 314R.

The drive pulses from circuit 314 are gated to the set lines of the various triggers in the ring (except trigger 301) by a series of gates. These gates (except gate 390) are designated by numerals which have a three in the hundreds digit and the two lower order digits of which designate the stages of the ring between which the gate is located. For example, gate 312 is located between the first and second stages of the ring and gate 323 is located between the second and third stages of the ring. Each of the gates is conditioned to pass a drive pulse from line 314C to the stage of the ring designated by the last numeral in the gate designation by the output of the stage of the ring which is designated by the center numeral in the gate designation. Hence, each gate is conditioned to pass a pulse from line 314C to its associated stage in the ring only when the preceding stage in the ring is active. The same pulse which activates each stage of the ring also resets the preceding stage of the ring. The first stage 301 of the ring circuit is turned ON by the pulse on line 301S. After the first stage has been turned on the other stages of the ring are successively turned on by pulses on line 314C.

The ring circuit shown in FIGURE 3 cannot step from condition 3 to condition 4 unless gate 316 is activated, thereby allowing pulses from line 316B to be gated to line 316C. At all times except when the system is operating in the S2*b* mode, (i.e., the fourth minor control sequence) line 317A, OR circuit 317 and line 317C are active, thereby conditioning gate 316 so that pulses on line 316B are gated to line 316C. If the system is operating in the S*b*2 mode, line 317A is not active since line 340A (which is connected to line 236C) will not be active. Therefore line 317C is only activated when compare circuit 50 produces an output on line 50A thereby indicating that it has found the matching register which contains the address of the defective location. For this reason when the system is operating in the S2*b* mode the timing circuit remains at position 3 until the compare circuit 50 activates line 50A to indicate that the search operation has been completed. When the system is not operating in the S2*b* mode the circuit steps from position 3 to position 4 in the normal manner.

The timer does not progress through all ten of its stages each time that one of the control sequences is activated. Instead it progresses through the required number of stages to complete the particular sequence which is activated. For example, each third minor control sequence only requires three time periods for its completion. Hence, during each third minor control sequence the ring circuit only progresses to position 3. The circuit can be reset at any point in its sequence of operations simultaneously activating all of the reset lines 301R to 310R and 314R. Hence, for example, when the circuit goes through a third minor control sequence all of the triggers are reset after the ring arrives at position 3. Since trigger 303 and timer 314 are the only circuits active at this time, they will be the only circuits upon which reset pulses will produce an effect.

In summary the timer circuit shown in FIGURE 3*a* operates as follows: Operation of the circuit is initiated by a signal on either line 315A or line 315B. Once operation of the circuit has initiated the circuit sequentially produces pulses on output lines T1 to T10. If the system is operating in a fourth minor control sequence the circuit does not step from position 3 to position 4 until compare circuit 50 produces the required signals on line 50A.

The time period between the pulses produced by circuit 314 and hence the time period between activation of each of the outputs T1 to T10 is selected such that the longest of the various control and addressing operations can occur. A time saving could be effected by a more complicated timer wherein the time period between activation of each of the various outputs would not be equal. Instead each time period would be dependent upon the length of time required to perform the control and addressing operation which occurs during the particular time period.

Figure 4:
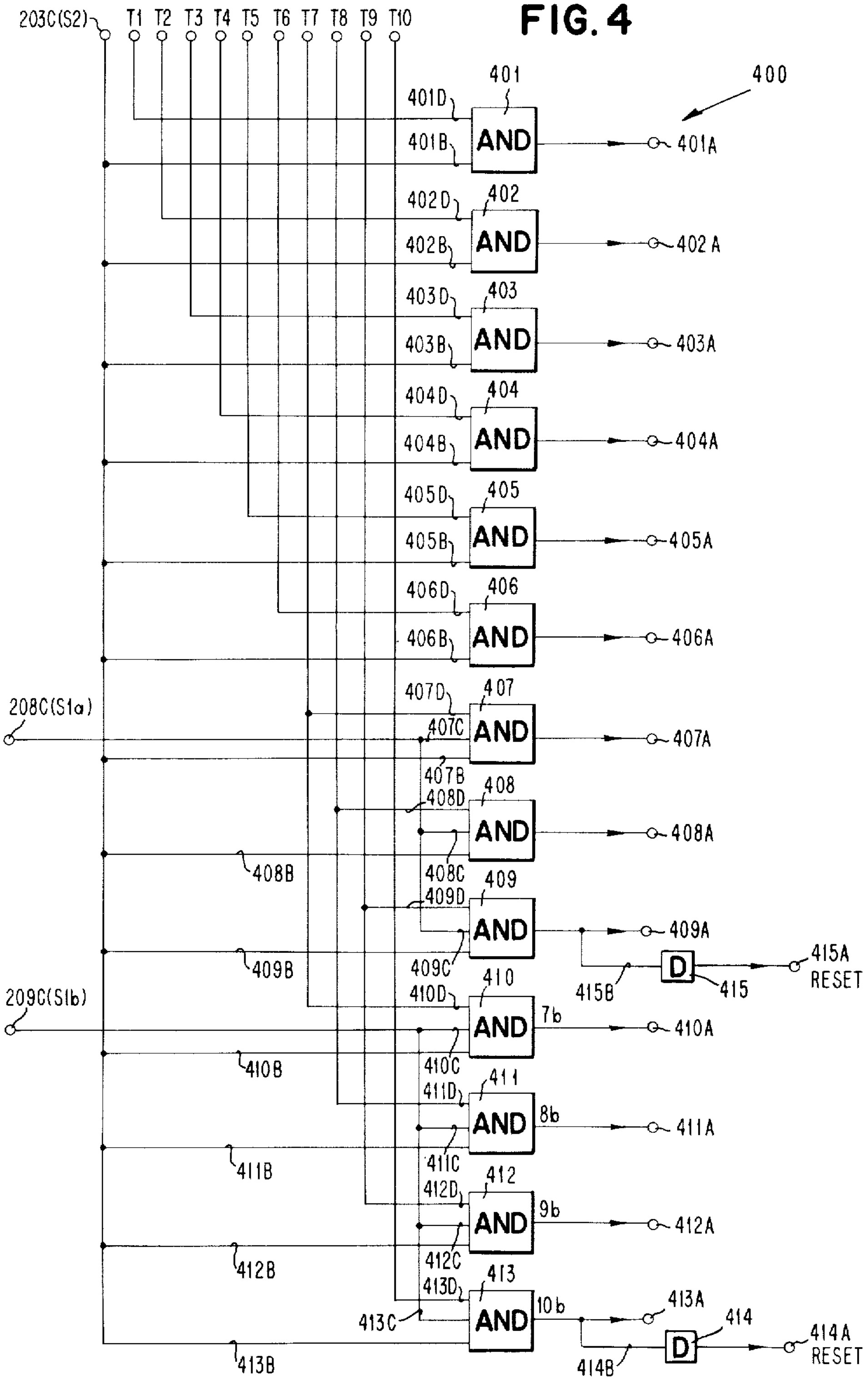

*Controls for first major control sequence.*—The circuitry 400 shown in FIGURE 4 (which is part of control circuit 43 shown in FIGURE 1*a*) receives pulses from the timing circuit 300 and from the outputs 203C, 208C and 209C of the sequence initiating circuitry shown in FIGURE 2*a*. The circuitry shown in FIGURE 4 consists of thirteen AND circuits 401 to 413 and two delay circuits 414 and 415. The AND circuits produce a series of comamnd pulses which activate the appropriate circuits and gates necessary to produce the sequence of operations that occur during each first major control sequence and during each first and second minor control sequence.

AND circuit 401 to 406 sequentially activate output lines 401A to 406A during each first major control sequence, AND circuits 407 to 409 sequentially activate output lines 407A to 409A during each first minor control sequence and AND circuits 410 to 413 seequentially activate output lines 410A to 413A during each second minor control sequence.

It should be noted that a first major control sequence as previously described includes either a first minor control sequence or a second minor control sequence. Hence, each time a first major control sequence is initiated either AND circuits 407 to 409 or AND circuits 410 to 413 are sequentially activated after AND circuits 401 to 406 have been sequentially activated.

Each of the AND circuits 401 to 413 is conditioned by one of the outputs from the timer circuit shown in FIGURE 3*a*. That is, each of the AND circuits 401 to 413 has one input, respectively 401D to 413D, which is conditioned by one of the lines T1 to T10. A second input for each of the AND circuits 401 to 413, respectively 401B to 413B, is connected to terminal 203C. The third input to AND circuit 407 to 409, respectively inputs 407C to 409C, is connected to terminal 208C. The third input to AND circuits 410 to 413, respectively input 410C to 413C, is connected to terminal 209C.

Circuit 400 operates as follows: When a word is read from memory into parity checking circuit 27 and parity checking circuit 27 recognizes that the word is in error, parity checking circuit 27 activates line 27B gating the word to the error correcting device 29 which after the error has been corrected activates line 29A thereby conditioning AND circuit 202 and activating trigger 203 and line 203C. After the above operations have occurred circuit 400 comes into operation and certain of the lines 401A to 413A are sequentially activated. Lines 401A to 413A are connected to the various gates and triggers as will be described to initiate the various operations which together comprise the first major control cycle.

The time delay between activation of the various lines is sufficient to allow the various operations to occur. The following paragraphs will merely indicate the operations that occur as a result of the activation of each line 401A to 413A, it being understood that the pulses supplied from circuit 300 are spaced sufficiently far apart to allow all of the various operations to occur.

Line 401A conditions gate 61 and gate 64 thereby gating an address from spare address counter 30 to the alternate address register 31 and to the memory addressing circuit 21, addressing memory 20 to the address specified by spare address counter 30; and activates lines 32B and 33B setting bit positions 32 and 33 in register 22 to the "one" condition.

Line 402A activates store line 24A of memory control 24 thereby reading the information in the storage register 22 into the previously addressed register of memory 20.

Line 403A conditions gates 62 and 66 thereby transferring the address contained in the spare address counter 30 to the storage register 22 in duplicate form; conditions gate 67 thereby transferring the address from memory address register 23 to memory addressing circuit 21 and addressing memory 20 to the address contained in the instruction counter 23.

Line 404A activates the store line 24A of memory control 24 thereby transferring the information from storage register 22 to the previously addressed location in memory 20.

Line 405A activates the read line 24B of memory control circuit 24 thereby reading that register in memory 20 which was previously addressed.

Line 406A conditions gates 69 and 70 thereby respectively transferring the information from the left and right hand section of storage register 22 to the parity checking circuitry 41 and 42.

Line 407A conditions memory control 24A thereby transferring to the previously addressed memory location the information in storage register 22.

Line 408A first conditions gate 64 thereby transferring the address from the alternate address 31 to the memory addressing circuit 21 and addressing memory 20 to the auxiliary memory location.

Line 409A activates the read line 24B memory control circuits 24 and control 90A of gate 90 thereby transferring the word from the previously addressed memory register to the storage register 22 and from there to parity checking circuit 27 and it also activates delay circuit 415. The output of delay circuit 415 activates line 30A thereby advancing the spare address counter 30 and it also activates the various reset lines resetting triggers 203 and 208, error correcting device 29 (through line 29A( and the triggers and timers in circuit 300.

Line 410A conditions gate 71 thereby transferring the address from memory address register 23 to the right section of memory register 22; conditions gate 62 thereby transferring the address from the spare address counter 30 to the left half of storage register 22; conditions gate 604 and gate 68 thereby transferring an address from the write counter 602 in matching register access control 40 to memory addressing circuit 21, thereby addressing memory 20 to the address specified by the write counter 602; activates lines 32B and 33B thereby setting bit positions 32 and 33 in register 22 to the "one" condition.

Line 411A activates the store control 24A of memory control 24 thereby storing the information from storage register 22 into the previously addressed location of memory 20 and pulses line 602C advancing write counter 602.

Line 412A conditions gate 64 thereby addressing memory 20 to the address specified in the alternate address register 31.

Line 413A activates the read line 24B of memory control 24 and control line 90A of gate 90 thereby transferring information from the previously addressed location in memory 20 to the storage register 22 and from there to parity check circuit 27. Line 413A also activates delay circuit 414. The output of delay circuit 414 activates line 30A thereby advancing the spare address counter 30 and it also activates the various reset lines, resetting triggers 203 and 209, error correcting device 29 (through line 29A) and the triggers and timer in circuit 300.

Figure 5A:
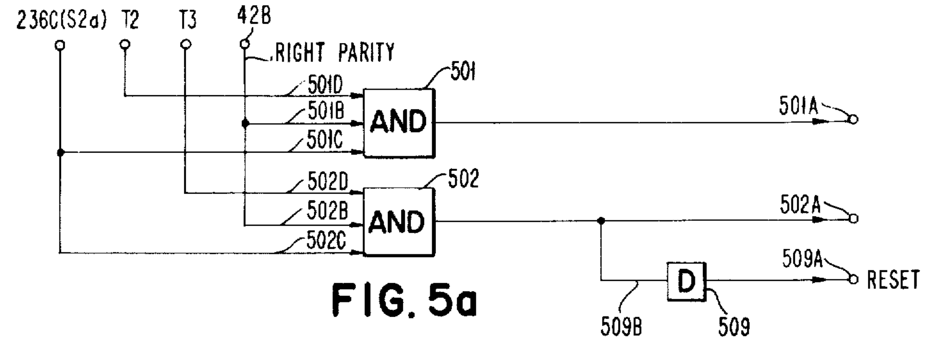
Figure 5B:
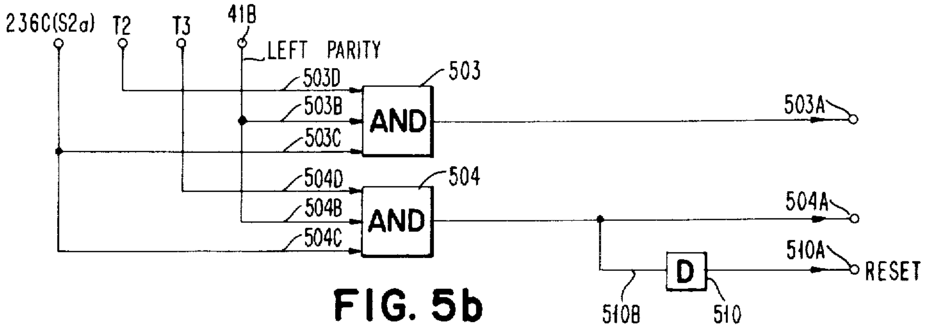
Figure 5C:
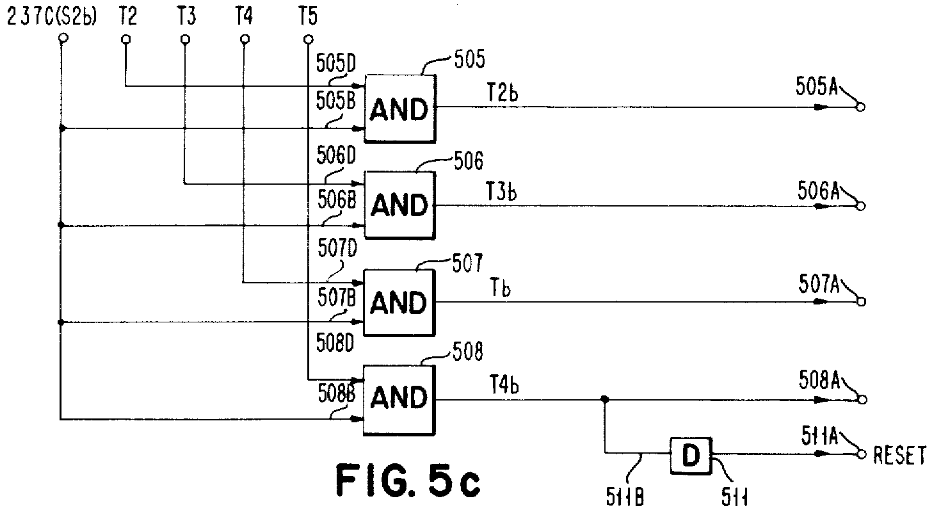

*Controls for second major control sequence.*—The circuitry which controls the second major control sequence of operations is shown in FIGURES 5*a*, 5*b* and 5*c*. This circuitry is part of the control circuitry 43 shown in FIGURE 1*b*. Input signals to the circuitry are provided from timing circuit 300 and from the second sequence triggers 235, 236 and 237. The circuitry produces a series of timed command pulses which condition the various gate and circuits necessary to produce the sequence of operations that takes place during the second major control sequence. As previously explained the second major control sequence includes the third and fourth minor control sequences.

The circuitry shown in FIGURE 5*a* controls the third minor control sequence of operations when the address of the auxiliary memory location is contained in the right half of the defective memory location, and the circuitry shown in FIGURE 5*b* controls the third minor control sequence of operations when the address of the auxiliary memory location is contained in the left half of the defective memory register. The circuitry shown in FIGURE 5*c* controls the operation of the fourth minor control sequence of operations. As previously explained a fourth minor control sequence occurs when the address of the auxiliary memory location is stored in one of the matching registers.

The circuitry shown in FIGURES 5*a*, 5*b* and 5*c* operates as follows: If the utilization device 28 causes a word to be read from memory into storage register 22 and AND circuit 230 detects that both of the error bits 32 and 33 is in the "zero" condition after the word has been read into register 22 the trigger 235 is set, activating line 235C. Line 235C is connected to line 28A and activation of line 28A suspends the operation of the utilization device 28. Activation of line 235C initiates a second major control sequence of operations.

Activation of line 235C gates the address from the right half and the address from the left half of storage register 22 through gates 69 and 70 to the respective parity checking circuits 41 and 42. If either parity checking circuit 41 or 42 finds that the parity of the address contained in its respective section of the register 22 checks, the respective circuit 41 or 42 will activate the respective line 41B or 42B thereby activating trigger 236C and conditioning gates 501 and 502 or 503 and 504 depending upon which line 41B or 42B is activated.

If the parity of neither the address contained in the right half nor the address contained in the left half of memory register 22 checks, the fourth minor control sequence trigger 237 is activated thereby conditioning AND circuits 505 to 508. After certain of the AND circuits 501 to 508 are conditioned by selected activation of lines 236C, 237C, 42B and 41B, the AND circuits which have been conditioned are sequentially activated by timing circuit 300. The time delay between activation of the various lines is sufficient to allow the various operation set out below to occur. The following paragraphs will merely indicate the operations that occur as a result of the activation of each line 501A to 508A, it being understood that the time pulses supplied from circuit 300 are spaced sufficiently far apart to allow all of the various operations to occur.

Line 501A activates line 82A thereby conditioning gate 82 to transfer the address contained in the left half of storage register 22 to the alternate address register 21, and activates line 64A thereby conditioning gate 64 to transfer the same address to the memory addressing circuitry 21 to address the memory 20 to the address specified in the right half of storage register 22.

Line 502A activates the readout line 24B of memory control 24 and control line 90A of gate 90 thereby reading out the previously addressed memory register into parity checking circuit 27; and activates line 509B thereby activating delay circuit 509. The output 509A of delay circuit 509 resets the triggers in timing circuit 300 and in sequence initiating circuitry 200 after the appropriate information is read from the memory.

Line 503A activates line 81A thereby conditioning gate 81 to transfer the address contained in the right half of storage register 22 to the alternate address register 21, and activates line 64A thereby conditioning gate 64 to transfer the same address to the memory address circuitry 21 to address the memory 20 to the address contained in the right half of storage register 22.

Line 504A activates the read line 24B of memory control 24 and control line 90A of gate 90 thereby reading the previously addressed register into storage register 22 and from there to parity checking circuit 27; and activates input line 501B of delay circuit 510. The output 510A of delay circuit 510 resets the triggers in sequence initiating circuitry 200 and in timing circuit 300 after the appropriate memory register is read into storage register 22.

Line 505A activates line 83A thereby conditioning gate 83 to transfer the address from memory address register 23 to compare circuit 50.

Line 506A activates input 617A of AND circuit 617 thereby initiating the search operation. Pulses from terminal 650C activate gate 68 to allow the addresses emitted by the matching register access control 40 to address the memory 20. The control line 87A of gate 87 and the read line 24A of memory control 24 are activated by the output 640A of delay circuit 640 thereby reading the appropriate words from memory 20 and gating them to the right hand section of compare circuit 50.

Line 507A activates control lines 82A and 64A of gates 82 and 64 thereby transferring the address from the left section of storage register 22 to the memory addressing circuit 21 and addressing memory 20 in accordance therewith. (Note that timer 300 does not step from stage three to stage four until the search operation is complete, hence line 506A is deactivated and line 507A is not activated until the search operation is complete.)

Line 508A activates the read line 24B of memory control 24 and control line 90A of gate 90 thereby reading the previously addressed memory location into storage register 22 and from there to parity checking circuit 27; and activates input line 511B of delay circuit 511 thereby resetting the various triggers after an appropriate delay.

Figure 7B:
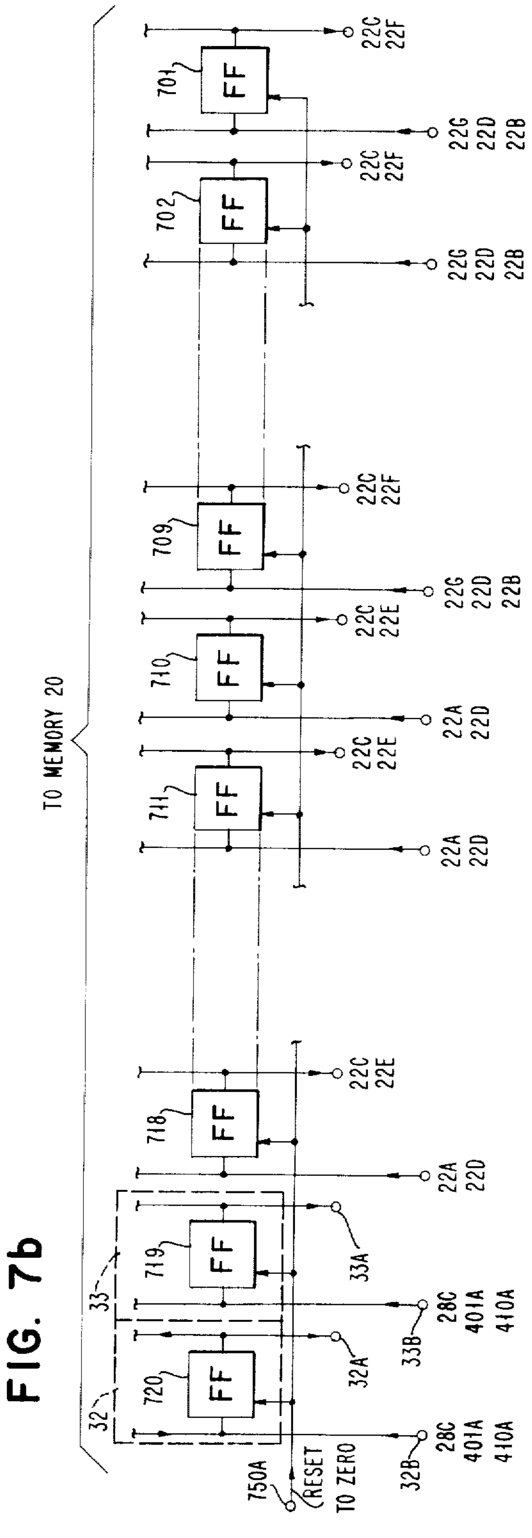
Figure 7A:
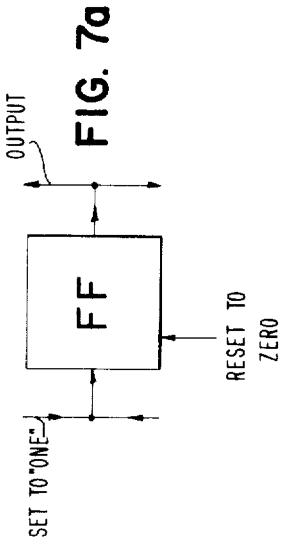

*Memory register 22.*—In the particular embodiment shown herein each register in memory 20 has twenty bit positions and likewise memory register 22 has twenty bit positions. The detailed circuitry of memory register 22 is shown in FIGURES 7*a* and 7*b*. There are twenty flip-flop circuits 701 to 720 in memory register 22; however, for ease of illustration only seven flip-flops 701, 702, 709, 710, 711, 718, 719 and 720 are shown.

Each of the bit positions of memory register 22 has a flip-flop circuit such as the flip-flop shown in FIGURE 7*a* associated therewith. Each flip-flop has two stable states, one stable state indicating a "one" condition and the other stable state indicating a "zero" state. In FIGURE 7*a* the various inputs and the output of a flip-flop circuit are labeled to indicate the functions which they perform. Each flip-flop has two inputs and an output, one of the inputs sets the flip-flop to the "zero" condition and the other input sets the flip-flop to the "one" condition. The single output line from each flip-flop is active only when the flip-flop is in the "one" condition.

After each memory cycle line 750A is activated thereby resetting each of the flip-flops to the "zero" condition. Thereafter selected flip-flops can be set to the "one" condition either in response to the state of some register in memory 20 or the flip-flops can be selectively set to the "one" condition by the various other circuit in the system. The lines which provide inputs to the flip-flops are designated in FIGURE 7*b* and likewise the lines which receive outputs from the flip-flops are designated in FIGURE 7*b*. The circuitry or gating from the flip-flops to the memory 20 and to the input and output lines is conventional and no further explanation thereof will be given.

*Error bits 32 and 33.*—In the particular embodiment of the invention shown herein two error bit positions have been provided in each register. Both of the error bit positions in any register are set to the "zero" condition to indicate that a particular register is defective.

The error bit positions in any particular register in memory 20 are set to the "one" or to the "zero" condition by setting positions 32 and 33 in register 22 to the desired condition and then addressing the memory to the particular register and performing a read in operation. Conversely the error bit positions in any particular register in memory 20 are interrogated by reading the particular register into register 20 and then interrogating lines 32A and 33A.

Naturally with minor modifications the system could be made to operate such that a "one" in the error bit positions would indicate that a register is defective. The choice of a "zero" to indicate that a register is defective was made in the present embodiment since memory 20 has the characteristic that when a bit position is defective the output from the bit positions appears as a "zero." The reason for this is that in the particular embodiment shown herein memory 20 is a magnetic core memory and if the various magnetic cores do not have the correct magnetic properties they do not produce an output when an attempt is made to change their states. Furthermore, a "zero" is stored in a bit position by not changing the magnetic state of the core. Hence, the output from a defective core appears as a "zero." The choice of a "one" or a "zero" to indicate defective memory registers is made so as to achieve the greatest reliability possible.

By certain obvious minor modifications the system could be made to operate with merely one error bit position. However, the provision of two error bit positions is an added reliability feature. If one of the error bit positions in a register fails it will not affect system operation. The system interprets a "one" in only one of the error bit positions in the same manner as it interprets a "one" in both positions. Hence, if both bits are set to the "one" condition and one bit position fails, the system wiill interpret the "one" in the remaining operative position in the same manner as it would if both positions were in the "one" condition.

*Examples of changes that can be made without departing from the invention.*—The embodiment of the invention as shown herein actually includes a combination of two systems each of which could be used individually. That is, the embodiment shown includes means for storing the address of the auxiliary memory location in the defective register and means for storing the address of the auxiliary memory location in a matching register if the address cannot be stored in the defective memory register. The combination of the two means mentioned above provides a more efficient and reliable system.

A system could be constructed which only had means for storing the address of each auxiliary memory location in the associated defective memory register. Such a system would have no provision for storing the address of the auxiliary memory location elsewhere if the defective memory register did not have sufficient operable bits in which to store the address. Naturally such a system would not be as reliable as the embodiment shown; however, it would be more economical to construct.

A system could be built wherein the address of each auxiliary memory register associated with a defective memory register would be stored in a matching register with the address of the defective memory register. Such a system would be reliable since it would not depend upon the fact that the defective memory register would have sufficient operable bits to store the address of the auxiliary memory location. However, such a system would be wasteful of memory locations since for each defective memory register it would require two additional memory registers, one to be used as an auxiliary memory location to store the corrected information and one to be used as a matching register.

From the above disclosure it can be seen that the system shown in detail herein combines the advantages of systems which merely have one or the other of the memory relocation schemes as described above. The invention as embodied herein provides a high degree of reliability without the use of an excessive number of extra memory locations.

Another manner in which the invention herein disclosed could be used to advantage would be if prior to the operation of a memory system selected test patterns of information were stored in each of the memory registers. These test patterns would simulate every possible combination of data bits which could be stored in the particular register thereby determining if any of the bit positions in the particular register failed under any of the possible conditions. Those registers which did fail would initially be tagged and the address of auxiliary memory locations assigned thereto stored therein or in associated matching registers as previously described.

In the embodiment of the invention shown herein, the matching registers are contained in the main memory 20 and the particular matching register desired is located by a search through the various matching registers as previously described. The searching operation could be facilitated and the time required for searching decreased by placing the matching registers in a small associative memory. That is, the speed of the system could be increased by placing the matching registers in a memory which could compare the address of the defective memory location to the content of the right half of each of the matching registers simultaneously and which could provide an indication of which particular matching register contained the address of the defective memory location in its right half. Such memories are known and are generally termed associative memories.

In the embodiment shown herein three separate parity checking circuits 27, 41 and 42 are shown. This was done in order to simplify the explanation and obviously one parity checking circuit with appropriate controls could have been used.

While the invention has been particularly shown and described with reference to a preferred embodiment thereof, it will be understood by those skilled in the art that the foregoing changes in form and detail are merely illustrative of the changes that may be made without departing from the spirit and scope of the invention.

What is claimed is:

1. A memory system which includes
a first multibit memory register which is specified by a first address and which includes one or more bit positions used as a tag field,
a second multibit memory register having a second address, the address of said second register being stored in said first register when said tag field is set to a first condition,
control means operative when said memory system reads said first memory register and responsive to said tag field to interpret the contents of said register as the address of said second register and to address and read out said second memory register,
whereby when said first memory register is addressed, and said tag field is set to said first condition, said second register is automatically addressed and read out.

2. A memory system including a plurality of registers wherein when a first register is found to be defective the information originally stored therein is stored in a second register,
an indicator for sensing such first defective register,
means for storing the address of said second register in a portion of said first register and for setting such indicator in said first register to indicate that said first register has been found to be defective and is now storing the address of said second register in which said original information is stored, means responsive to said indicator, operative when said first register is addressed, to readdress the system to the second register, the address, of which, is stored in said first register.

3. A memory system having a plurality of addressable memory registers each of said registers having defect indicator means to indicate that a particular register is defective, said defect indicating means being set to a first condition to indicate that the particular register is defective, a plurality of addressable auxiliary memory registers, one for each of the registers in said first plurality of registers wherein said defect indicating means is set to indicate that the associated register is defective, the address of the auxiliary memory register corresponding to each defective register being stored in a select section of the particular defective memory register, detection means for detecting that the defect indicator means of one of said memory registers is set to said first condition when said register is addressed and read out, means responsive to said detection means for interpreting the content of a select section of a register as the address of an auxiliary memory register and for readdressing said selected register to the address of said auxiliary memory register.

4. A memory system including a plurality of memory registers each having an address wherein when a first register having a first address is found to be defective the information stored therein is stored in a second register having a second address;

control means for storing the address of said first register in a first portion of a third register having a third address and for storing the address of said second register in a second portion of said third register, control means effective when said first defective register is addressed to cause said third register to be addressed and said second address stored in said second portion thereof to be read out to be available in addressing said second register in which said information is stored.

5. A memory system including a plurality of memory registers each having an address wherein when a first register having a first address is found to be defective the information stored therein is stored in a second register having a second address and said first register is tagged, control means for storing the address of said second register in a portion of said first register, means responsive to said tag when said defective register is subsequently addressed with said first address to readdress said defective register to the register whose address is contained in a portion of said first register.

6. In a memory system having a plurality of multibit addressable memory registers, means for detecting and tagging defective memory registers, first means for assigning a first operable register to each register found to be defective, second means for determining if a register found to be defective contains enough operable bits in a selected section thereof to store the address of said first operable register, third means responsive to said second means for storing the address of said first operative register in said selected section of said defective register when said defective register is found to contain sufficient operable bits to store said address, fourth means responsive to said second means for assigning a second operative register to each defective register found to contain insufficient operable bits in said selected section to store the address of said first operative register and for storing the address of said first operative register in a first section of said second operative register and for storing the address of the associated defective register in a second section of said second operative register, fifth means operative when said defective register is subsequently addressed for determining if said defective register contains the address of said first operative register, sixth means responsive to said fifth means for addressing said defective register to the address contained in said defective register when said defective register is found to contain the address of said first operative register, seventh means responsive to said fifth means for addressing said defective register to said second operative register when said defective register is found not to contain the address of said first operative register and for subsequently addressing said defective register to the register whose address is contained in said second operative register.

7. In a data handling device the combination of a memory which includes a plurality of multibit memory registers for storing information words, each memory register having one or more error bit positions to indicate that the particular register has one or more defective bit positions, a selected plurality of said memory registers being designated as auxiliary memory registers and a selected plurality of said memory registers being designated as matching registers;

memory input-output means for selectively addressing and reading into or out of any one of said memory registers;

means for detecting defective memory registers, means for setting the error indicating bits in a memory register found to be defective to indicate that the particular register is defective, means for correcting information read from defective memory registers, means for activating said memory input-output means to store the corrected information in an auxiliary memory location, means for activating said memory input-output means to store the address of said auxiliary memory location in a plurality of sections of said defective memory location, testing means for testing whether any one of said sections of said defective memory register has sufficient operable bits to store the address of the auxiliary memory register wherein the corrected information is stored, a plurality of matching registers each having a first section and a second section, means responsive to said testing means for storing the address of a particular defective location in the first section of a matching register and the address of the auxiliary memory location wherein the corrected information is stored in the second section of the same matching register if the defective register does not have sufficient operable bits to store the address of the auxiliary memory location, detecting means for detecting that the error indicator bits in a memory register read out by said memory input-output means are set to indicate that the particular memory register is defective, referencing means responsive to said detecting means for referencing said memory input-out means to the auxiliary memory location which contains the corrected information.

8. The combination recited in claim 7 wherein said referencing means comprises means responsive to said detection means to gate the contents of a register which is read out by said memory input-output means and which has its error bits set to indicate that the register is inoperative to said testing means to determine if the particular register contains the address of an auxiliary memory register in any one of its sections, means responsive to said testing means for gating the contents of any section of said register found to contain the address of an auxiliary memory location to said memory input-output means whereby said memory is addressed to said auxiliary memory location.

9. The combination recited in claim 7 wherein said referencing means comprises means responsive to said detection means to gate the contents of a register which is read out by said memory input-output means and which has its error bits set to indicate that the register is inoperative to said testing means to determine if the particular register contains the address of an auxiliary memory register in any one of its sections, means responsive to said testing means for gating the contents of any section of said register found to contain the address of an auxiliary memory location to said memory input-output means whereby said auxiliary register is read out, searching means operative in response to said detecting means when said register is found not to contain the address of an auxiliary memory location in any one of its sections for sequentially searching said matching registers to find the particular matching register which contains the address of the particular defective location which was read out in its first section, means for activating said memory input-output means for addressing said memory to the particular auxiliary memory location whose address is contained in the second section of a matching register found to contain the address of the defective memory location which was read out.

10. The combination recited in claim 7 wherein said referencing means comprises;

means responsive to said detection means to gate the contents of a register which is read out by said memory input-output means and which has its error bits set to indicate that the register is inoperative to said testing means to determine if the particular register contains the address of an auxiliary memory register in any one of its sections, means responsive to said testing means for activating said memory input-output means to sequentially read out the various matching registers when an addressed defective memory location does not contain the address of an auxiliary memory location in any one of its sections, comparing means for comparing the address of a defective memory register to the contents of the first section of each matching register which is read out, means for addressing said memory to the particular auxiliary memory location whose address is contained in the second section of a matching register found to contain the address of the defective memory location initially read out in its first section.

11. In a data handling device; the combination of a memory which includes a plurality of multibit memory registers for storing information words, each information word including parity information, and each memory register having one or more error bit positions to indicate that the particular register has one or more inoperable bit positions;

memory input-output means for selectively addressing and reading into or out of any one of said memory registers;

means for checking the parity of information read from a memory register, errors in parity being taken as an indication that the particular memory register contains defective bit positions;

means for setting the error indicating bits in memory registers found to be defective to indicate that the particular register is defective;

means for correcting information read from defective memory registers;

means for activating said memory input-output means to store the corrected information in an auxiliary memory location;

means for referencing the address of the auxiliary memory location wherein corrected information is stored with the address of the defective memory location where the information was originally stored;

detecting means for detecting that the error indicator bits in a memory register read out by said memory input-output means are set to indicate that the particular memory register is defective; and means responsive to said detecting means for referencing said memory input-output means to the corresponding auxiliary memory location.

12. In a data handling system which includes a memory having a plurality of multibit memory registers for storing information words certain of said registers being designated as auxiliary memory registers, and memory input-output means for selectively addressing and reading information from or into any memory register the combination of;

settable means associated with each memory register to indicate when set that the particular memory register has one or more defective bit positions therein;

means for locating defective memory registers;

a spare address counter for assigning a different auxiliary memory register for each memory register found to be defective;

means for activating said memory input-output means to store the address of the auxiliary memory register assigned by said spare address counter in a plurality of sections of the defective memory location;

means responsive to said settable means operative upon read out of a memory register previously found to be defective for interpreting the data in said defectice memory location as the address of an auxiliary memory location and for gating the address of the auxiliary memory location to said addressing means.

13. A data handling system which includes a memory having a plurality of multibit memory registers for storing information words, certain of said registers being designated as auxiliary memory registers and certain other of said registers being designated as matching registers and memory input-output means for selectively addressing any one of said memory registers, and for reading information from or into any addressed memory register, settable means associated with each memory register to indicate when set that the particular memory register has one or more defective bit positions therein;

means for assigning a different auxiliary memory register for each memory register found to be defective;

means for assigning a particular matching register for memory registers found to be defective;

means for activating said memory input-output means to store the address of the defective memory location and the address of the assigned auxiliary memory location in the assigned matching register;

searching means responsive to said settable means upon read out of a memory register previously found to be defective for searching the various matching registers to find the particular matching register which contains the address of the defective memory location;

means for activating said memory input-output means to address and read out the auxiliary memory location whose address is contained in the same matching register as the address of the defective memory register.

14. The data handling system recited in claim 13 wherein said searching means comprises;

means responsive to said settable means upon read out of a memory register previously found to be defective for interrogating the various matching registers to find the particular matching register which contains the address of a partial defective memory register, the interrogation starting with the matching register found to contain the address of the desired defective register during the preceding interrogation and then proceeding sequentially through the various matching registers until the matching register which contains the address of the defective register is found.

15. In a data handling system which includes a memory having a plurality of multibit memory registers for storing information words, certain of said registers being designated as auxiliary memory register and certain other of said registers being designated as matching registers, said matching registers being divided into first and second sections, settable means associated with each memory register to indicate when set that the particular memory register has one or more defective bit positions therein, memory input-output means for selectively reading into or out of any memory register;

means for locating defective memory registers;

a spare address counter for assigning a different auxiliary memory register for each memory register found to be defective;

a second counter for assigning a particular matching register for each memory register found to be defective;

means for activating said memory input-output means to store the address of the defective memory location in the first section of the assigned matching register and to store the address of the assigned auxiliary memory register in the second section of the assigned matching register;

third counter means for sequentially emitting the address of the various matching registers;

means responsive to said third counter for activating said memory input-output means to read out of the registers, the addresses of which are emitted by said third counter;

means for comparing the content of the first section of each matching register, which is read out to the address of the defective memory register;

means for activating said memory input-output means to read out the auxiliary memory registers, the address of which is in the second section of the matching register found to contain the address of the defective register in its first section.

16. In a data handling system which includes a memory having a plurality of multibit memory registers for storing information words, each information word including parity information, one or more bit positions in each memory register being used as error bit positions to indicate whether or not the particular register is defective, certain of said memory registers being designated as auxiliary memory registers and certain other of said memory registers being designated as matching registers, each of said matching registers being divided into first and second sections;

memory input-output means for addressing and reading into or out of any particular register in said memory;

means for checking the parity of information words read from memory, errors in parity being taken as an indication that the particular memory location contains defective bit positions;

a first counter for assigning an auxiliary memory register for each memory register found to contain defective bit positions;

means to determine if any sections of a defective memory location contains sufficient operable bits to store the address of a defective memory location;

second counter means for assigning a different matching register for each defective memory register found not to contain sufficient operable bits to store the address of the corresponding auxiliary memory register;

means for storing the address of a defective memory register in the first section of a matching register;

means for storing in the second section of the particular matching register the address of the auxiliary memory location assigned to the defective memory location whose address is stored in the first section of the same matching register;

comparing circuitry for comparing two addresses;

a third counting means for sequentially emitting the addresses of the various matching registers;

first control means operable when a memory register is found to be defective, for causing said first counter to assign an auxiliary memory register to the particular defective memory register, for testing said defective memory register to determine if it contains sufficient operable bits to store the address of the auxiliary memory location in any one of its sections, for causing said memory input-output means to store the address of the auxiliary memory location in any section of said defective memory registers found to contain sufficient operable bits to store said address, for causing said second counter means to assign a matching register to said defective memory location if no section of said defective memory register has sufficient operable bits for storing the address of the particular auxiliary memory register assigned, and causing said memory input-output means to store the address of the defective memory register in the first section of the matching register and the address of the assigned auxiliary memory register in the second section of the assigned matching register if a matching register is assigned;

second control means responsive to the error bits when a memory register previously found to be defective is subsequently read out by said memory input-output means for addressing and reading out the auxiliary memory register whose address is stored in one section of said defective memory register if said defective memory register has sufficient operable bits to store said address, for searching said matching registers to find the particular matching register which contains the address of the defective memory register and for addressing and reading out the auxiliary memory register whose address is in the second section of the particular matching register if said defective memory register does not contain the address of the auxiliary memory register.

References Cited by the Examiner

UNITED STATES PATENTS 3,012,227 12/1961 Astrahan et al. ---- 340—172.5

ROBERT C. BAILEY, *Primary Examiner.*

MALCOLM A. MORRISON, *Examiner.*